(12) United States Patent
Tahara et al.

(10) Patent No.: US 7,347,043 B2
(45) Date of Patent: Mar. 25, 2008

(54) EXHAUST GAS PURIFIER FOR INTERNAL COMBUSTION ENGINE

(75) Inventors: Jun Tahara, Toyota (JP); Tatsumasa Sugiyama, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/397,573

(22) Filed: Apr. 5, 2006

(65) Prior Publication Data

US 2006/0225407 A1    Oct. 12, 2006

(30) Foreign Application Priority Data

Apr. 8, 2005    (JP)    ............... 2005-112851

(51) Int. Cl.
  *F01N 3/00*    (2006.01)
(52) U.S. Cl. .................. 60/297; 60/277; 60/286; 60/295; 60/303
(58) Field of Classification Search .......... 60/277, 60/278, 280, 286, 295, 297, 300, 303, 311
  See application file for complete search history.

(56) References Cited

U.S. PATENT DOCUMENTS

| | | | |
|---|---|---|---|
| 6,779,339 B1 * | 8/2004 | Laroo et al. ................. | 60/297 |
| 6,823,663 B2 * | 11/2004 | Hammerle et al. ........... | 60/286 |
| 6,877,312 B2 * | 4/2005 | Nakatani et al. .............. | 60/288 |
| 6,990,800 B2 * | 1/2006 | van Nieuwstadt et al. .... | 60/277 |
| 7,076,944 B2 * | 7/2006 | Okugawa et al. ............. | 60/295 |
| 7,168,237 B2 * | 1/2007 | Ueda et al. ................... | 60/277 |
| 7,210,285 B2 * | 5/2007 | Sato et al. .................... | 60/295 |
| 2004/0098971 A1 | 5/2004 | Upadhyay et al. | |
| 2004/0244362 A1 | 12/2004 | Hiranuma et al. | |

FOREIGN PATENT DOCUMENTS

| | | |
|---|---|---|
| JP | 2002-227636 | 8/2002 |
| JP | 2004-143988 | 5/2004 |

* cited by examiner

*Primary Examiner*—Binh Q. Tran
(74) *Attorney, Agent, or Firm*—Oblon, Spivak, McClelland, Maier & Neustadt, P.C.

(57) ABSTRACT

The exhaust gas purifier includes a fuel addition valve, an NOx catalytic converter, and a catalyst loaded PM filter. The catalyst temperature of catalyst loaded PM filter is increased to a target temperature by adding fuel to the exhaust gas from fuel addition valve, whereby PM trapped on the filter is purified. When the NOx catalytic converter is deteriorated, the target catalyst temperature of catalyst loaded PM filter is changed to a value larger than the target catalyst temperature when the NOx catalytic converter is in a normal state.

14 Claims, 10 Drawing Sheets

F I G. 7
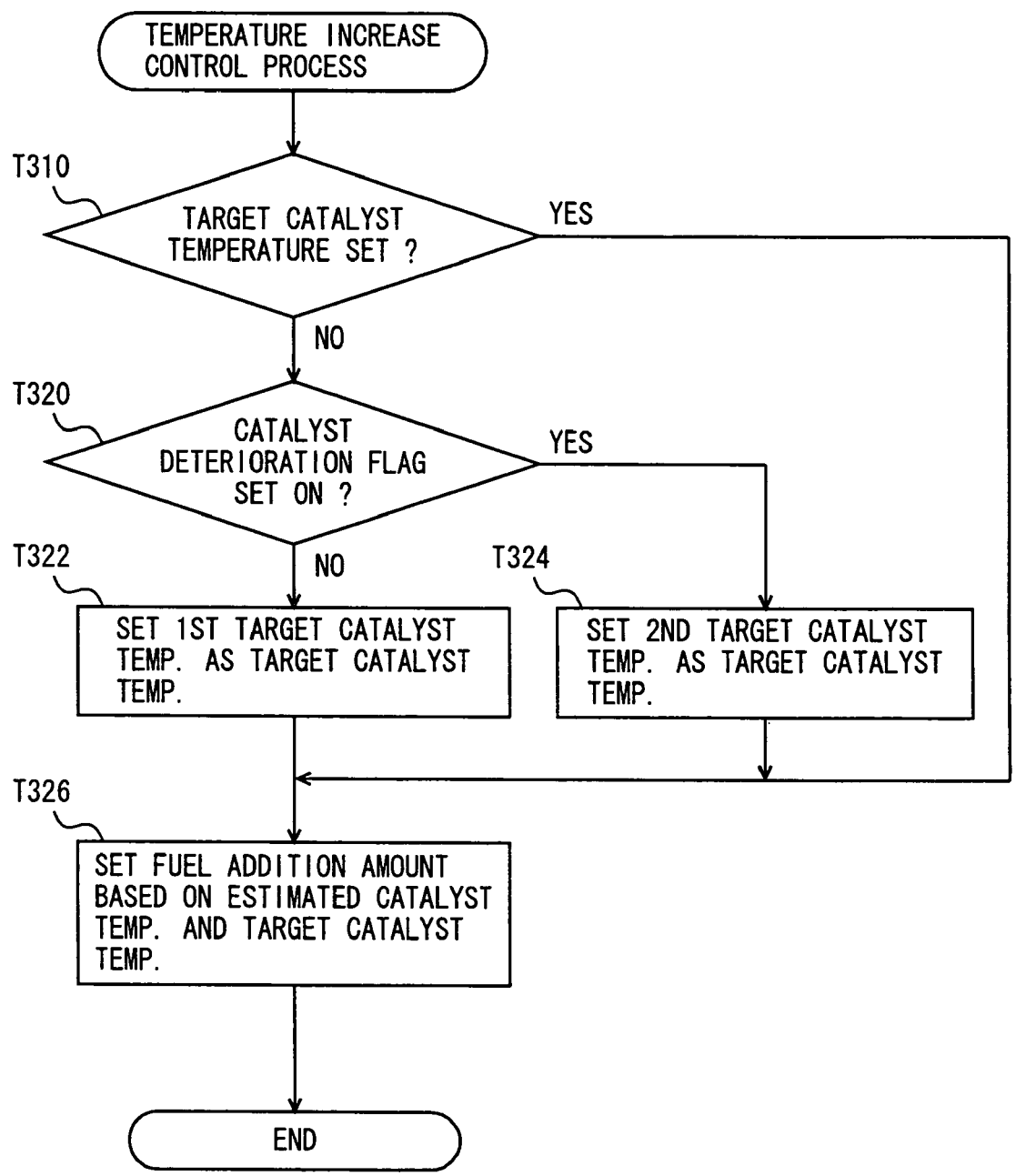

US 7,347,043 B2

EXHAUST GAS PURIFIER FOR INTERNAL COMBUSTION ENGINE

This nonprovisional application is based on Japanese Patent Application No. 2005-112851 filed with the Japan Patent Office on Apr. 8, 2005, the entire contents of which are hereby incorporated by reference.

BACKGROUND OF THE INVENTION

1. Field of the Invention

The present invention relates to an exhaust gas purifier for an internal combustion engine.

2. Description of the Background Art

An exhaust gas purifier is formed to have an additive supplying unit (such as a fuel addition valve for injecting fuel to the exhaust gas) for supplying an additive to the exhaust gas, a catalyst device promoting oxidation of the additive supplied to the exhaust gas, and an exhaust filter arranged downstream of the catalyst for trapping particulate matter (PM) in the exhaust gas (see Japanese Patent Laying-Open No. 2004-143988).

In such an exhaust gas purifier, when the deposition of PM on the exhaust filter is assumed to have reached the limit, a PM regeneration control for burning the trapped PM is performed. In the PM regeneration control, the additive is supplied to the exhaust gas in order to increase the temperature of exhaust filter to a target value.

Consequently, the exhaust gas is heated to a high temperature by heat generation caused by oxidation of the additive in the catalyst device, and by the hot exhaust gas flowing to the exhaust filter, PM is burned. Further, PM on the filter is also burned by the heat resulting from oxidation of the additive at the exhaust filter.

In the exhaust gas purifier, catalytic function of the catalyst device may sometimes be deteriorated. When PM regeneration control takes place where catalytic function has been deteriorating, though the additive is supplied to the exhaust gas, oxidation of the additive at the catalyst device is insufficient, and therefore, what is supplied to the exhaust filter would be exhaust gas of low temperature (exhaust gas at a lower temperature than the exhaust gas supplied to the exhaust filter through the PM regeneration control with normally functioning catalyst device). Further, the exhaust gas contains much additive that has not been burned in the catalyst device. In other words, exhaust gas of relatively low temperature containing much additive is supplied to the exhaust filter.

Therefore, when the catalytic function is deteriorated, the temperature of exhaust filter is mainly increased by the oxidation of additive at the filter. At this time, much heat generated by the oxidation of additive builds up at the downstream portion of the filter, while heat build-up is insufficient at the upstream portion of the filter, so that the PM purifying ability on the upstream portion of the filter decreases. In such a case, PM is not fully burned out but remains on the upstream portion of the filter, possibly resulting in clogging of the filter.

In the exhaust gas purifier described in Japanese Patent Laying-Open No. 2004-143988, though it is possible to detect deterioration of catalytic function, no measure is taken for the decreased PM purifying ability as described above, and therefore, it is difficult to avoid clogging of the exhaust filter or the like.

SUMMARY OF THE INVENTION

An object of the present invention is to provide an exhaust gas purifier for an internal combustion engine that can suppress decrease in the ability of purifying particulate matter on the upstream portion of an exhaust filter even when catalytic function of the catalyst device deteriorates.

In the following, measures to attain the above-described object as well as functions and effects thereof will be described.

According to as aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit changing the target temperature of the exhaust filter to a value higher than the target temperature before detection of deterioration of catalytic function of the catalyst device, when deterioration of catalytic function of the catalyst device is detected.

According to the invention, when the catalytic function deteriorates, the temperature of exhaust filter as a whole is maintained at a higher value than when the target temperature is not changed, and therefore, oxidation of the particulate matter, which could not be fully burned by the conventional exhaust gas purifier, is promoted. As a result, even when the catalytic function of the catalyst device deteriorates, decrease in particulate matter purifying ability at the upstream portion of the exhaust filter can be suppressed.

Preferably, the control unit changes the target temperature in consideration of degree of deterioration of catalytic function of the catalyst device.

The amount of remaining particulate matter that has not been burned when catalytic function deteriorates is correlated with the degree of deterioration of the catalytic function. Therefore, in the present invention, the target temperature is changed in consideration of the degree of deterioration of the catalytic function, so that excessive or insufficient supply of the additive is avoided, and highly efficient burning of the particulate matter becomes possible.

More preferably, when the target temperature of the exhaust filter, which is set based on deterioration of catalytic function of the catalyst device, exceeds an upper limit of target temperature, the control unit sets the upper limit of target temperature as the target temperature of the exhaust filter.

In the present invention, when the catalytic function deteriorates, the value that can be set as the target temperature is limited to an upper limit of target temperature. Therefore, possible damage to the exhaust filter caused by setting too high the target temperature can be prevented. Here, the upper limit of target temperature corresponds to the highest possible temperature of the exhaust filter that does not cause thermal damage to the exhaust filter.

According to another aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit setting a first target temperature as a target temperature of the exhaust filter when deterioration of catalytic function of the catalyst device is not detected, and setting a second target temperature higher than the first target temperature as the target temperature of the exhaust filter when deterioration of catalytic function of the catalyst device is detected.

According to the present invention, when the catalytic function deteriorates, the temperature of exhaust filter as a whole is maintained at a higher value than when the second target temperature is not set as the target temperature, and therefore, oxidation of the particulate matter, which could not be fully burned by the conventional exhaust gas purifier, is promoted. As a result, even when the catalytic function of the catalyst device deteriorates, decrease in particulate matter purifying ability at the upstream portion of the exhaust filter can be suppressed.

According to a still further aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit setting the target temperature of the exhaust filter based on an index value indicating degree of deterioration of catalytic function of the catalyst device, when deterioration of catalytic function of the catalyst device is detected.

In the present invention, the target temperature is set in accordance with the degree of deterioration of catalytic function, which is correlated with the amount of particulate matter not burned but remained when the catalytic function deteriorates, and therefore, even when the catalytic function of the catalytic device deteriorates, decrease in the particulate matter purifying ability at the upstream portion of the exhaust filter can be suppressed. As an index indicating the degree of deterioration, by way of example, a difference between the measured value of exhaust gas temperature immediately downstream of the catalyst device and the estimated valued of exhaust gas downstream of the catalyst device may be used.

According to a still further aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit setting an upper limit target temperature of the exhaust filter as the target temperature of the exhaust filter, when deterioration of catalytic function of the catalyst device is detected.

In the present invention, when the catalytic function deteriorates, the upper limit of target temperature is set as the target temperature, and the exhaust filter as a whole is maintained at a temperature higher than in the conventional exhaust gas purifier. Therefore, oxidation of particulate matter that could not be fully burned by the conventional exhaust gas purifier can be promoted. Consequently, when the catalytic function of catalyst device deteriorates, decrease in particulate matter purifying ability at the upstream portion of the exhaust filter can be suppressed. Further, possible damage to the exhaust filter caused by setting too high the target temperature can be prevented.

According to a still further aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit monitoring temperature of an upstream portion in the exhaust filter and setting amount of supply of the additive to increase the temperature of the upstream portion to the target temperature, when deterioration of catalytic function of the catalyst device is detected.

In the present invention, when the catalytic function deteriorates, the temperature at the upstream portion in exhaust filter is increased to a target temperature, and therefore, oxidation of particulate matter that could not be fully burned by the conventional exhaust gas purifier can be promoted. Therefore, when the catalytic function of catalyst device deteriorates, decrease in particulate matter purifying ability at the upstream portion of the exhaust filter can be suppressed.

Preferably, the control unit sets the amount of supply of the additive, based on a degree of deviation between the temperature at the upstream portion of the exhaust filter and the target temperature.

According to the present invention, the amount of additive to be supplied is determined based on the degree of deviation between the temperature of the upstream portion in the exhaust filter and the target temperature, and therefore, when catalytic function deteriorates, the temperature at the upstream portion can exactly be maintained at the target temperature. Consequently, the particulate matter at the upstream portion can sufficiently be purified.

According to a still further aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit correcting the amount of supply of the additive set based on a difference between estimated temperature of the exhaust filter and the target temperature of the exhaust filter, in a direction to increase the amount of supply, when deterioration of catalytic function of the catalyst device is detected.

In the present invention, when the catalytic function deteriorates, the amount of additive to be supplied, which is set based on the difference between the estimated temperature and the target temperature of the exhaust filter, is increased and corrected, whereby the temperature of exhaust filter is maintained at a value higher than the target temperature. Consequently, oxidation of particulate matter that could not be fully burned by the conventional exhaust gas purifier can be promoted. Therefore, when the catalytic function of catalyst device deteriorates, decrease in particulate matter purifying ability at the upstream portion of the exhaust filter can be suppressed.

Preferably, the control unit corrects the amount of supply of the additive in consideration of degree of deterioration of catalytic function of the catalyst device.

The amount of remaining particulate matter that has not been burned when catalytic function deteriorates is correlated with the degree of deterioration of the catalytic function. Therefore, in the present invention, the amount of additive to be supplied is corrected in consideration of the degree of deterioration of the catalytic function, so that excessive or insufficient supply of the additive is avoided, and highly efficient burning of the particulate matter becomes possible.

More preferably, the control unit limits degree of correction of the amount of supply of the additive such that estimated temperature of the exhaust filter is maintained lower than an upper limit of target temperature. The upper limit of target temperature corresponds to the highest possible temperature that does not cause thermal damage to the exhaust filter.

In the present invention, when the catalytic function deteriorates, the amount of additive to be supplied is increased so that the temperature of exhaust filter is maintained at a value higher than the target temperature, and on the other hand, the amount to be supplied is corrected so that the temperature of the exhaust filter does not exceed the upper limit of target temperature. Therefore, the damage to the exhaust filter, possibly caused when it is maintained at an excessively high temperature, can be prevented.

More preferably, the control unit determines, using temperature of exhaust gas in an exhaust passage downstream of the catalyst device and upstream of the exhaust filter as a reference exhaust gas temperature, that catalytic function of the catalyst device is deteriorated, when a degree of deviation between the reference exhaust gas temperature estimated based on a state of operation of the internal combustion engine and the reference exhaust gas temperature measured by an exhaust gas temperature sensor exceeds a reference value.

When the catalytic function is deteriorated, oxidation in the catalyst device becomes insufficient, and therefore, the reference exhaust gas temperature measured by an exhaust gas temperature sensor indicates a value lower than when catalytic function is not deteriorated. Therefore, when the catalytic function deteriorates, deviation between the detected value and the estimated value of reference exhaust gas temperature increases.

In the present invention, such a tendency of deviation between the detected value and the estimated value of the reference exhaust gas temperature is utilized to determine whether the catalytic function is deteriorating or not. Therefore, deterioration of the catalytic function can exactly be detected.

According to a still further aspect, the present invention provides an exhaust gas purifier for an internal combustion engine, including an additive supplying unit supplying an additive to the exhaust gas, a catalyst device having a function of promoting oxidation of the additive, and an exhaust filter arranged downstream of the catalyst device and having functions of trapping particulate matter and of promoting oxidation of the additive, including: a processing unit increasing, when a condition for purifying the particulate matter trapped by the exhaust filter is satisfied, temperature of the exhaust filter to a target temperature by supplying the additive from the additive supplying unit; and a control unit correcting the target temperature to a larger value, when a degree of deviation between measured temperature of the exhaust gas flowing to the exhaust filter and estimated temperature of the exhaust gas exceeds a reference value.

In the present invention, when the catalytic function deteriorates, the temperature of exhaust filter as a whole is maintained at a higher value than when the target temperature is not corrected, and therefore, oxidation of the particulate matter, which could not be fully burned by the conventional exhaust gas purifier, is promoted. As a result, even when the catalytic function of the catalyst device deteriorates, decrease in particulate matter purifying ability at the upstream portion of the exhaust filter can be suppressed.

Preferably, the exhaust filter is a filter trapping particulate matter, loaded with a storage reduction type NOx catalyst.

More preferably, the exhaust filter is a filter trapping particulate matter, loaded with an oxidizing catalyst.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart representing process steps of "temperature increase control process" executed by an electronic controller in accordance with a second embodiment of an exhaust gas purifier for an internal combustion engine of the present invention.

DESCRIPTION OF THE PREFERRED EMBODIMENTS

First Embodiment

The first embodiment of the present invention will be described with reference to FIGS. 1 to 6.

In the present embodiment, the exhaust gas purifier for an internal combustion engine is assumed to be implemented as an exhaust gas purifier for a diesel engine.

<Diesel Engine Structure>

Figure 1:
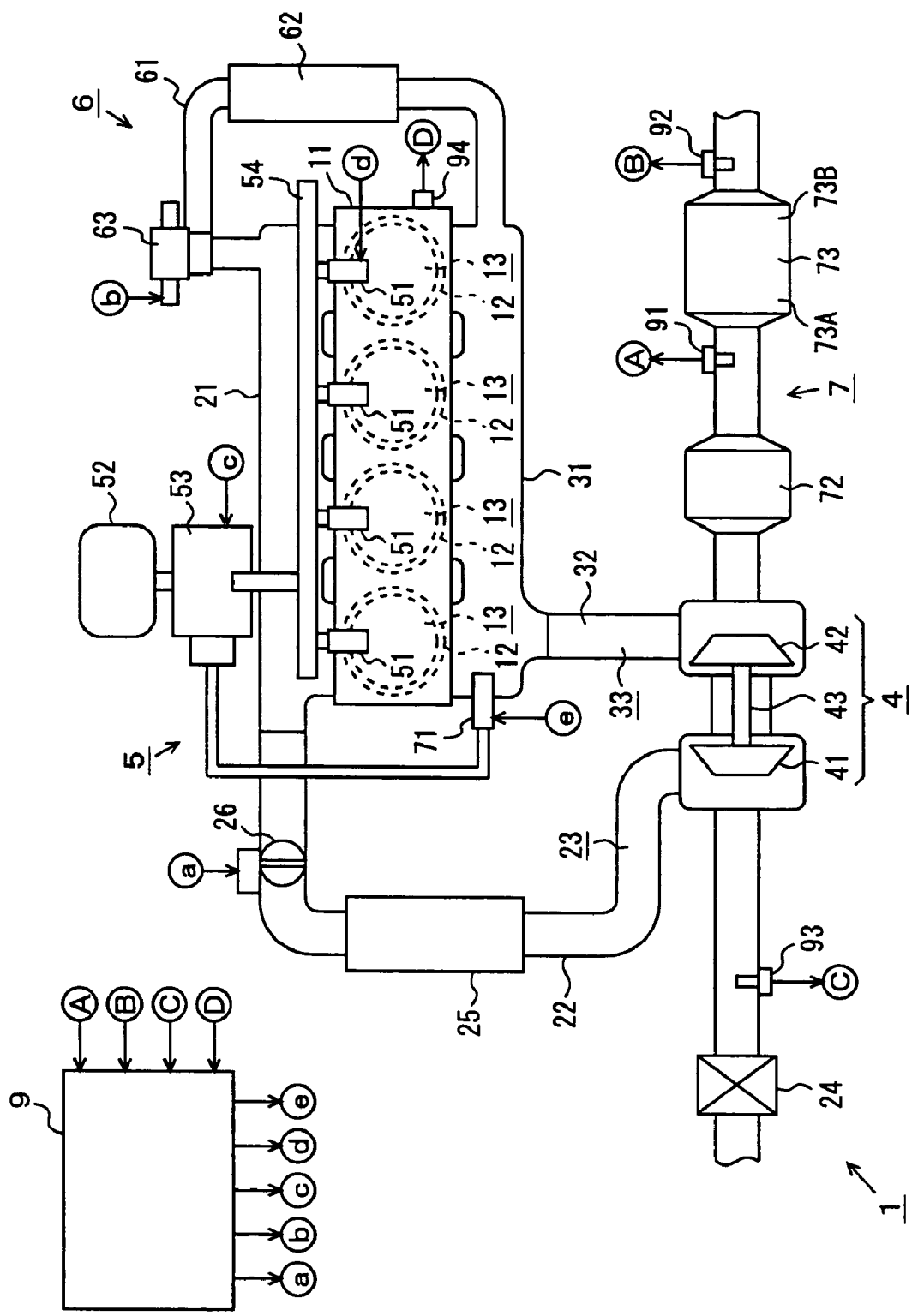
FIG. 1 shows an overall structure of a diesel engine including an exhaust gas purifier for an internal combustion engine in accordance with a first embodiment of the present invention.

FIG. 1 schematically shows a structure of a diesel engine, to which the present invention is applied. Diesel engine 1 includes an engine body 11, a turbo charger 4, a common rail type fuel supply device 5, an exhaust gas recirculator 6 and an exhaust gas purifier 7. These components are controlled by an electronic controller 9.

Engine body 11 is provided with a plurality of cylinders 12. In cylinder 12, a combustion chamber 13 is formed to burn air-fuel mixture.

The intake system of diesel engine 1 has an intake passage 23 formed of an intake port of engine body 11, an intake manifold 21 and an intake pipe 22, for distributing external air to combustion chamber 13.

Along intake passage 23, an air cleaner 24, a compressor wheel 41 of turbo charger 4, an inter cooler 25 and a throttle valve 26 are arranged from the upstream side of airflow.

The exhaust system of diesel engine 1 has an exhaust passage 33 formed of an exhaust port of engine body 11, an exhaust manifold 31 and an exhaust pipe 32, for distributing gas in combustion chamber 13 to the outside.

Along exhaust passage 33, a fuel addition valve 71 of exhaust gas purifier 7, a turbine wheel 42 of turbo charger 4, and an NOx catalytic converter 72 and a catalyst loaded PM filter 73 of exhaust gas purifier 7 are arranged, from the upstream side of exhaust gas flow. In the present embodiment, fuel addition valve 71 corresponds to the additive supplying unit. Further, NOx catalytic converter 72 corresponds to the catalyst device. Further, catalyst loaded PM filter 73 corresponds to the exhaust filter.

(1) Turbo Charger Structure

Turbo charger 4 compresses air in intake pipe 22 using the energy of exhaust gas, to increase the amount of air to be supplied to combustion chamber 13.

Turbo charger 4 is formed by a compressor wheel 41 arranged in intake passage 23, a turbine wheel 42 arranged in exhaust passage 33, and a rotor shaft 43 connecting the wheels 41 and 42. By the energy of exhaust gas, both the turbine wheel 42 and compressor wheel 41 are rotated, to compress intake air.

(2) Structure of Common Rail Type Fuel Supply Device

Common rail type fuel supply device 5 injects fuel with high pressure to combustion chamber 13, to cause burning of fuel in combustion chamber 13.

Common rail type fuel supply device 5 is formed by a fuel injection valve 51, a fuel tank 52, a fuel pump 53 and a common rail 54. Fuel injection valve 51 injects fuel to the combustion chamber of the corresponding cylinder 12.

Fuel pump 53 takes in the fuel of fuel tank 52, pressurizes the intake fuel to a prescribed pressure, and supplies the fuel to common rail 54. Common rail 54 maintains the fuel supplied from fuel pump 53 in the highly pressurized state. The fuel in common rail 54 is injected to the combustion chamber in cylinder 12 through fuel injection valve 51, as the fuel injection valve 51 is opened.

(3) Structure of Exhaust Gas Recirculator

Exhaust gas recirculator 6 supplies part of the exhaust gas to intake pipe 22, so as to decrease the combustion temperature of air-fuel mixture and thereby to reduce generation of nitrogen oxide (NOx).

Exhaust gas recirculator 6 is formed by a connection pipe 61, an EGR cooler 62 and an EGR valve 63. Connection pipe 61 connects exhaust passage 33 on the upstream side than turbine wheel 42 to intake passage 23 on the downstream side than throttle valve 26. In connection pipe 61, EGR cooler 62 and EGR valve 63 are arranged, from the upstream side of exhaust gas flow.

EGR cooler 62 cools exhaust gas supplied through connection pipe 61 to intake pipe 22. EGR valve 63 adjusts flow rate of exhaust gas supplied through connection pipe 61 to intake pipe 22.

(4) Structure of Exhaust Gas Purifier

Exhaust gas purifier 7 purifies particulate material (PM), nitrogen oxide (NOx), carbon hydride (HC) and carbon monoxide (CO) in the exhaust gas.

Exhaust gas purifier 7 is formed by a fuel addition valve 71, an NOx catalytic converter 72 and a catalyst loaded PM filter 73. NOx catalytic converter 72 is formed of a catalyst carrier carrying a storage reduction type NOx catalyst.

In NOx catalytic converter 72, NOx is purified in the following manner.

(a) When the exhaust gas is in an oxidizing atmosphere (lean state), NOx in the exhaust gas is taken and stored in NOx catalyst.

(b) When the exhaust gas is in a reducing atmosphere (at the state of stoichiometric air-fuel ratio or rich state), NOx stored in the NOx catalyst is separated in the form of nitrogen monoxide (NO), and reduced by HC or CO.

Here, "the state of stoichiometric air-fuel ratio" refers to a state where the air-fuel ratio of exhaust gas corresponds to the theoretical air-fuel ratio, the "lean state" refers to the state where the air-fuel ratio of exhaust gas is larger than the theoretical air-fuel ratio, and the "rich state" refers to the state where the air-fuel ratio of exhaust gas is smaller than the theoretical air-fuel ratio.

Catalyst loaded PM filter 73 is formed to include a porous ceramic structured body (PM filter) that can trap PM in the exhaust gas. Further, the PM filter is loaded with the NOx storage-reduction catalyst.

Catalyst loaded PM filter 73 traps and purifies PM in the exhaust gas in the following manner.

(a) When the exhaust gas passes through the wall of porous ceramic structured body, PM in the exhaust gas is trapped by the wall of ceramic structured body.

(b) When the exhaust gas is at a high temperature, the trapped PM is oxidized by oxygen in the exhaust gas.

(c) The trapped PM is oxidized by active oxygen generated when NOx is taken in and stored or when NOx is discharged.

In catalyst loaded PM filter 73, NOx is purified in the similar manner as NOx catalytic converter 72. In the following, an upstream side portion of catalyst loaded PM filter 73 will be referred to as an upstream portion 73A of the filter, and a downstream side portion of catalyst loaded PM filter 73 will be referred to as a downstream portion 73B of the filter.

Fuel addition valve 71 adds fuel to the exhaust gas, by injecting the fuel (additive). To fuel addition valve 71, fuel of lower pressure than the fuel supplied to common rail 54 is supplied through fuel pump 53.

The fuel injected from fuel addition valve 71 is supplied, together with the exhaust gas, to NOx catalytic converter 72 and catalyst loaded PM filter 73. In diesel engine 1, for the purpose of supplying fuel to NOx catalytic converter 72 and catalyst loaded PM filter 73, the fuel is injected (added) by fuel addition valve 71. Details of fuel addition operation by fuel addition valve 71 will be described later.

(5) Control System Structure

Electronic controller 9 is formed to include a central processing unit executing operations related to engine control, a read only memory having a program and a map necessary for engine control stored in advance, a random access memory temporarily storing the results of calculation and the like by the central processing unit, an input port for inputting an external signal, and an output port for outputting a signal to the outside.

To the input port of electronic controller 9, a first exhaust gas temperature sensor 91, a second exhaust gas temperature sensor 92, an air flow meter 93, a rotation speed sensor 94 and the like for detecting the state of engine operation are connected.

First exhaust gas temperature sensor 91 is provided in exhaust passage 33 on the downstream of NOx catalytic converter 72 and upstream of catalyst loaded PM filter 73, and outputs an electric signal in accordance with the temperature of exhaust gas (first exhaust gas temperature TEi) flowing to catalyst loaded PM filter 73. The output signal of first exhaust gas temperature sensor 91 is input to electronic controller 9 and thereafter used for various control as the first measured exhaust gas temperature TEiM. In the present embodiment, the first exhaust gas temperature TEi corresponds to the reference exhaust temperature.

Second exhaust gas temperature sensor 92 is provided in exhaust passage 33 on the downstream of catalyst loaded PM filter 73, and outputs an electric signal in accordance with the temperature of exhaust gas (second exhaust gas temperature TEo) flowing out from catalyst loaded PM filter 73. The output signal of second exhaust gas temperature sensor 92 is input to electronic controller 9 and thereafter used for various control as the second measured exhaust gas temperature TEoM.

Air flow meter 93 is provided in intake passage 23 on the downstream of air cleaner 16 and upstream of compressor wheel 41, and outputs an electric signal in accordance with the flow rate of air (intake air amount GA) flowing through intake pipe 22. The output signal of air flow meter 93 is input to electronic controller 9 and thereafter used for various control as the measured intake airflow rate GAM.

Rotation speed sensor 94 is provided in the vicinity of a crank shaft, and outputs an electric signal in accordance with the speed of rotation of crank shaft (engine speed NE). The output signal of rotation speed sensor 94 is input to electronic controller 9 and thereafter used for various control as the measured engine speed NEM.

To the output port of electronic controller 9, driving circuits for driving throttle valve 26, EGR valve 63, fuel pump 53, fuel injection valve 51, fuel addition valve 71 and the like are connected. Based on the state of operation of engine as known from detection signals from various sensors described above, electronic controller 9 sets required values for various control parameters (such as the amount of fuel injection (fuel injection amount FI) by fuel injection valve 51, and amount of fuel addition (fuel addition amount FA) by fuel addition valve 71). Then, the controller outputs an instruction signal corresponding to the required value, to the driving circuit for each of the components connected to the output port.

Through such control of driving circuits, electronic controller 9 realizes various control processes, including throttle control for adjusting opening position of throttle valve 26, EGR control for adjusting opening position of EGR valve 63, discharge pressure control for adjusting discharge pressure of fuel pump 53, fuel injection control for fuel injection from fuel injection valve 51, and fuel addition control for fuel injection from fuel addition valve 71. The control unit is configured including electronic controller 9.

<Exhaust Gas Purification Control>

In the present embodiment, control for purifying exhaust gas, including "PM regeneration control" in which PM on catalyst loaded PM filter 73 is burned, "S-poisoning recovery control" in which sulfur oxide (SOx) that has been taken and stored in NOx catalyst is reduced and discharged, and "NOx reduction control" in which NOx that has been taken and stored in NOx catalyst is reduced and discharged, is performed.

For PM regeneration in which PM is burned and for S-poisoning recovery for reducing and emitting SOx, it is necessary to set the temperature (catalyst temperature) of NOx catalytic converter 72 and catalyst loaded PM filter 73 to a sufficiently high temperature. Therefore, in PM regeneration control and S-poisoning recovery control, temperature is controlled such that the catalyst temperature is increased to a value necessary for PM regeneration and S-poisoning recovery (for example, 600° C. to 700° C.).

For temperature increase control, fuel addition by fuel addition valve 71 to the exhaust gas is continuously repeated with relatively short interval, so as to increase amount of fuel supply to the NOx catalyst (NOx catalytic converter 72 and catalyst loaded PM filter 73). Consequently, by the heat generated through oxidation of fuel in the exhaust gas and on the catalyst, the catalyst temperature is increased.

(1) PM Regeneration Control

In exhaust gas purifier 7, as the amount of PM trapped by catalyst loaded PM filter 73 increases, pressure loss at the PM filter 73 increases. Therefore, before the pressure is lost to such an extent as to cause deteriorated state of engine operation, PM deposited on the filter must be purified.

Therefore, when it is estimated that the amount of PM deposited on catalyst loaded PM filter 73 has reached a limit, temperature increase control is done, through PM regeneration control.

Because of oxidation of fuel at NOx catalytic converter 72, the exhaust gas at high temperature is supplied to catalyst loaded PM filter 73, and by the increased temperature of catalyst loaded PM filter 73, PM is burned. Further, as the fuel that has passed through NOx catalytic converter 72 is oxidized by catalyst loaded PM filter 73, PM is burned by the heat generated through oxidation.

(2) S-Poisoning Recovery Control

NOx catalyst of NOx catalytic converter 72 and catalyst loaded PM filter 73 tend to absorb, together with NOx, SOx generated from sulfur derived from the fuel or lubricant. On the other hand, the amount of storage of NOx catalyst is limited, and therefore, if the amount of SOx taken and stored therein comes to be excessively large, the ability of absorbing NOx decreases (S-poisoning). Therefore, in exhaust gas purifier 7, it is necessary to reduce SOx stored in the NOx catalyst, before taking and storage of NOx is affected by the increased amount of SOx storage.

Therefore, when it is estimated that the amount of SOx stored in the NOx catalyst has reached a limit, temperature increase control and SOx reduction control are performed, through S-poisoning recovery control.

Consequently, NOx catalytic converter 72 and catalyst loaded PM filter 73 are heated to a high temperature through temperature increase control and, thereafter, air-fuel ratio of exhaust gas is made rich through SOx reduction control, so that NOx catalytic converter 72 and catalyst loaded PM filter 73 are maintained in a high-temperature, reducing atmosphere. Then, SOx that has been stored in the NOx catalyst is reduced and thereafter discharged from the NOx catalyst.

(3) NOx Reduction Control

In exhaust gas purifier 7, it is necessary to reduce and discharge NOx stored in the NOx catalyst before the amount of NOx storage of NOx catalytic converter 72 and catalyst loaded PM filter 73 reaches the limit.

Therefore, when it is estimated that the amount of NOx stored in the NOx catalyst has reached a limit, electronic controller 9 causes intermittent fuel addition by fuel addition valve 71, through NOx reduction control.

Consequently, the air-fuel ratio of exhaust gas around the NOx catalyst temporarily comes to the state of stoichiometric air-fuel ratio or rich state, and therefore, NOx in NOx catalytic converter 72 and catalyst loaded PM filter 73 is reduced. It is noted that during NOx reduction control, the catalyst temperature is kept relatively low (for example, 250° C. to 500° C.).

While the temperature increase control is being executed for PM regeneration control or S-poisoning recovery control described above, after-injection by fuel injection valve 51 may be done as needed. The after-injection refers to fuel injection performed in the compression stroke or exhaust stroke after the end of pilot-injection or main injection, and it is fuel injection different from the fuel injection supplied for combustion in combustion chamber 13 such as the pilot-injection or main injection. Therefore, much of the fuel injected in after-injection is not burned in combustion chamber 13 but discharged to the exhaust system, whereby fuel in the exhaust gas increases and the catalyst temperature increases.

<Deterioration of NOx Catalytic Converter>

In exhaust gas purifier 7, catalytic function of NOx catalytic converter 72 may possibly deteriorates. Deterioration of catalytic function here refers to decrease in the ability of oxidation, to be lower than the required ability. In the following, when the catalytic function of NOx catalytic converter 72 is deteriorated, NOx catalytic converter 72 is said to be in a deteriorated state, and when the catalytic function of NOx catalytic converter 72 is not deteriorated, the NOx catalytic converter 72 is said to be in a normal state.

When PM regeneration control takes place while NOx catalytic converter 72 is in the deteriorated state, though fuel is added to the exhaust gas through temperature increase control, oxidation of fuel at the NOx catalytic converter 72 is insufficient, and therefore, exhaust gas at a low temperature (exhaust gas at a temperature lower than that supplied to catalyst loaded PM filter 73 through PM regeneration control with the NOx catalytic converter being in the normal state) is supplied to catalyst loaded PM filter 73. Further, the exhaust gas contains a large amount of fuel that has not been burned at NOx catalytic converter 72. Specifically, what is supplied to catalyst loaded PM filter 73 is exhaust gas containing much fuel at a relatively low temperature.

Therefore, when NOx catalytic converter 72 is in the deteriorated state, the catalyst temperature of catalyst loaded PM filter 73 is mainly increased by the oxidation of fuel at the filter 73. At this time, on the downstream portion 73B of the filter, much heat generated by oxidation builds up, while such heat does not much build up at the upstream portion 73A of the filter. Therefore, the PM purifying ability decreases at the upstream portion 73A of the filter. Further, difference in catalyst temperature between the downstream portion 73B and upstream portion 73A of the filter tends to increase than when NOx catalytic converter 72 is in the normal state.

Specifically, during PM regeneration control with NOx catalytic converter 72 being in the deteriorated state, even if the catalyst temperature at the downstream portion 73B of the filter were high enough to burn PM, the catalyst temperature at the upstream portion 73A of the filter would not be increased to such a temperature. In such a case, PM is not burned but remains at the upstream portion 73A of the filter, and PM would continuously be deposited, possibly causing clogging of the filter.

Here, taking PM regeneration control in which the catalyst temperature of catalyst loaded PM filter 73 is increased to a target catalyst temperature through feedback control as a model, the mechanism why PM is not fully burned but remains can be described as follows.

When NOx catalytic converter 72 is in the normal state and the catalyst temperature (catalyst temperature monitored for control) of catalyst loaded PM filter 73 is increased to the target catalyst temperature through PM regeneration control, the catalyst temperature necessary for PM regeneration is attained in PM filter 73 as a whole.

On the other hand, when the NOx catalytic converter 72 is in the deteriorated state, increase of catalyst temperature at the upstream portion 73A of the filter is smaller than when the NOx catalytic converter 72 is in the normal state. Therefore, it may be the case that though the catalyst temperature of catalyst loaded PM filter 73 (catalyst temperature monitored for control) has been increased to the target catalyst temperature, the actual catalyst temperature at the upstream portion 73A of the filter has not reached the temperature necessary for PM regeneration. In that case, PM is not fully burned but remains at the upstream portion 73A of the filter.

In view of the foregoing, in the PM regeneration control of the present embodiment, "catalyst deterioration determining process" (FIG. 3) for detecting the deteriorated state of the NOx catalytic converter and "target catalyst temperature changing process" (FIG. 5) for burning PM that would not be fully burned by common PM regeneration control when NOx catalytic converter 72 is in the deteriorated state, are performed.

<PM Regeneration Control Process>

Figure 2:
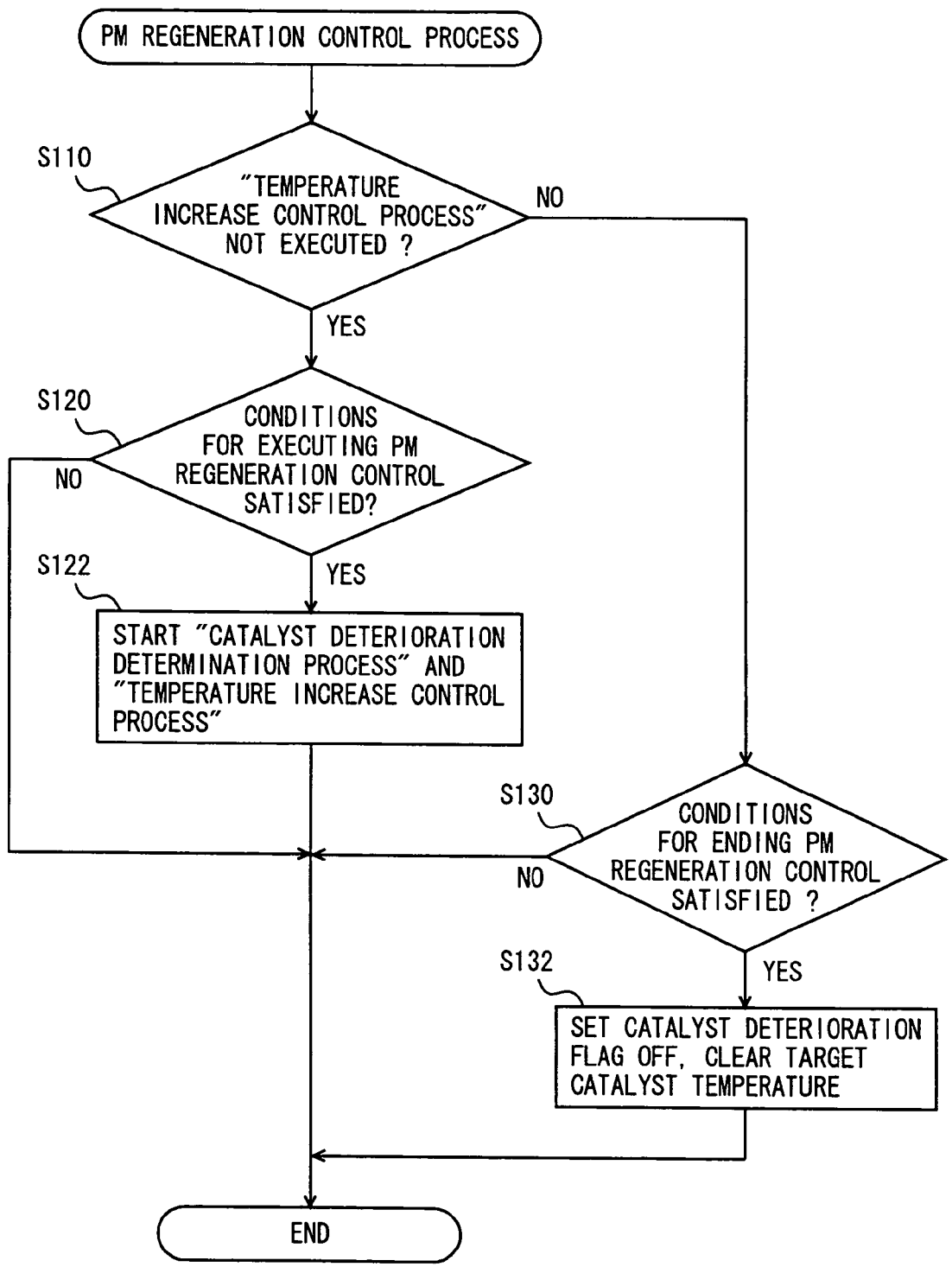
FIG. 2 is a flowchart representing process steps of "PM regeneration control process" executed by an electronic controller in accordance with the first embodiment.

Referring to FIG. 2, "PM regeneration control process" will be described. This process is repeated by electronic controller 9 at a prescribed time interval. In the following description, the filter catalyst temperature TF refers to the catalyst temperature of catalyst loaded PM filter 73, and the target catalyst temperature refers to the target value of filter catalyst temperature TF in temperature increase control.

[Step S110] Whether "temperature increase control process" (FIG. 4) for increasing the filter catalyst temperature TF to the target catalyst temperature TFT is being executed or not is determined.

If the "temperature increase control process" is not executed, the flow proceeds to step S120. If the "temperature increase control process" is executed, the flow proceeds to step S130.

[Step S120] Whether conditions for executing PM regeneration control are satisfied or not is determined.

If the conditions for execution are satisfied, the flow proceeds to step S122. If the conditions for execution are not satisfied, "PM regeneration control process" is temporarily terminated.

In the process of step S120, the conditions for execution of PM regeneration control are determined to be satisfied, if the following conditions [a] and [b] are satisfied.

[a] The amount of PM deposited on catalyst loaded PM filter 73 (PM deposition amount) has reached the limit.

[b] State of engine operation allows execution of PM regeneration control.

In the process of step S120, the PM deposition amount can be determined to have reached the limit when either one of the following conditions [c] and [d] is satisfied.

[c] The PM deposition amount estimated from the operation history (amount of intake air and amount of fuel injection) of diesel engine 1 is not smaller than a prescribed value.

[d] Degree of deviation between the measured pressure at the upstream and the measured pressure at the downstream of catalyst loaded PM filter 73 is larger than a prescribed value.

[Step S122] "Catalyst deterioration determining process" (FIG. 3) and "temperature increase control process" (FIG. 4) are started. Consequently, in the next period of control for the "PM regeneration control process," it follows that the flow proceeds from step S110 to step S130.

[Step S130] Whether conditions for terminating PM regeneration control are satisfied or not is determined.

If the termination conditions are satisfied, the flow proceeds to the process of step S132. If the termination conditions are not satisfied, "PM regeneration control process" is temporarily stopped.

In the process of step S130, it can be determined that the conditions for terminating PM regeneration control are satisfied, if either one of the following conditions [a] and [b] is satisfied.

[a] The PM deposition amount estimated from the operation history (amount of intake air and amount of fuel injection) of diesel engine 1 is smaller than the prescribed value.

[b] Degree of deviation between the measured pressure at the upstream and the measured pressure at the downstream of catalyst loaded PM filter 73 is smaller than a prescribed value.

In exhaust gas purifier 7 of the present embodiment, time period from when the conditions for executing PM regeneration control are satisfied until when the conditions for terminating PM regeneration control are satisfied corresponds to the duration of PM regeneration control. Specifically, the time period corresponds to one cycle of the PM regeneration control.

[Step S132] A catalyst deterioration flag eFC set through the "catalyst deterioration determining process" (FIG. 3) is set to "OFF". The target catalyst temperature TFT set through the "temperature increase control process" (FIG. 4) is cleared. The conditions for executing and terminating the PM regeneration control are not limited to those described above, and may be modified appropriately.

(1) Catalyst Deterioration Determining Process

Figure 3:
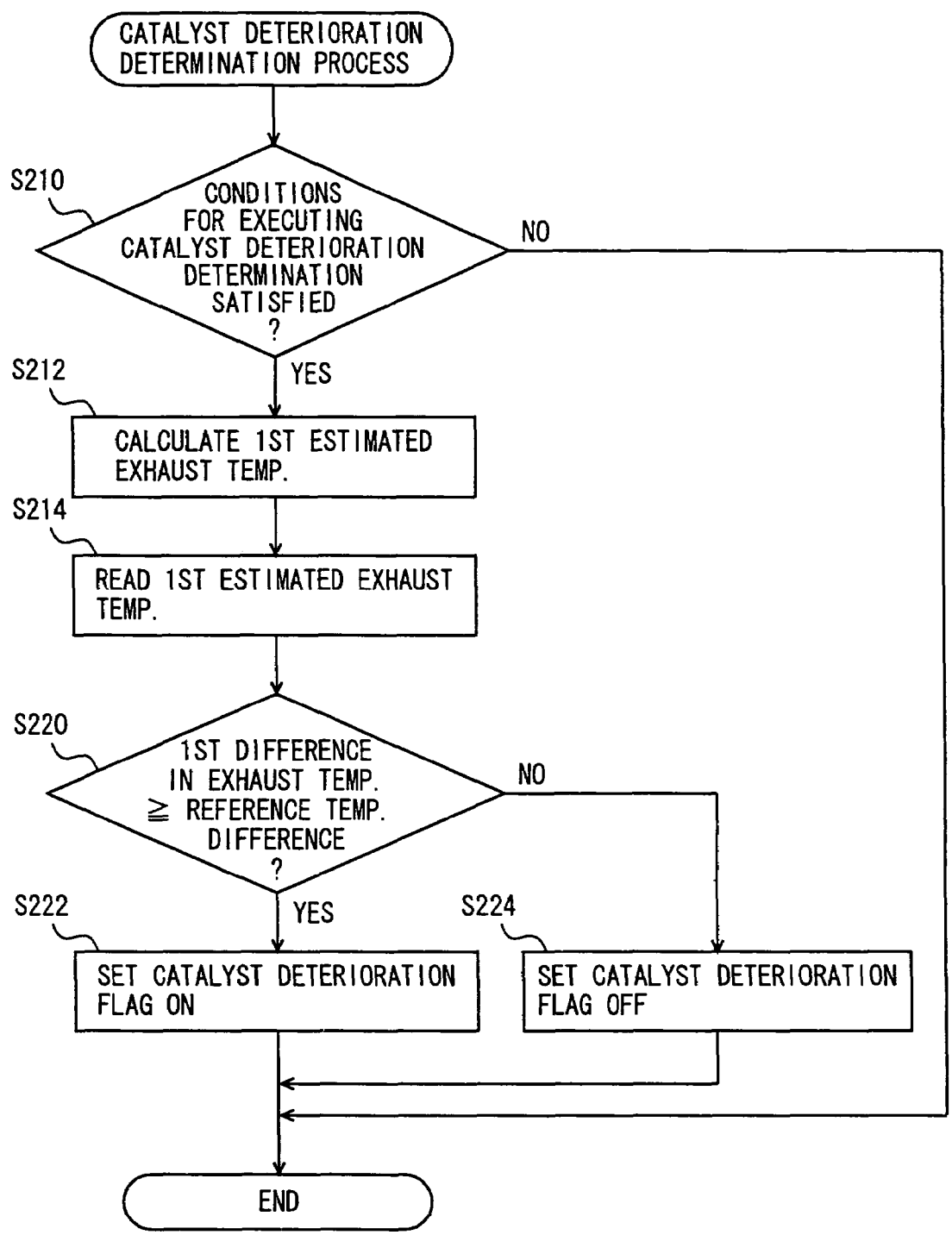
FIG. 3 is a flowchart representing process steps of "catalyst deterioration determination process" executed by the electronic controller in accordance with the first embodiment.

FIG. 3 shows the "catalyst deterioration determining process" for detecting the deteriorated state of NOx catalytic converter 72. This process is executed repeatedly by electronic controller 9 at a prescribed time interval, from when the conditions for executing PM regeneration control are satisfied until the conditions for terminating PM regeneration control are satisfied.

[Step S210] Whether prerequisite conditions for determining the deteriorated state are satisfied or not is determined.

In the present embodiment, the following three are the prerequisite conditions.

1) The first measured exhaust gas temperature TEIM is not lower than a prescribed value.

2) Estimated catalyst temperature of catalyst loaded PM filter 73 is not lower than the reference estimated value.

3) Target catalyst temperature of catalyst loaded PM filter 73 is not lower than the reference target value.

The prerequisite conditions are set as conditions for determining whether the filter catalyst temperature TF has been increased to a sufficiently high temperature (here, target catalyst temperature TFT) and whether it is in a stable state or not. Specifically, when all the prerequisite conditions are satisfied, it is possible to consider that the filter catalyst temperature TF is changing stably near the target catalyst temperature TFT. It is noted that the prerequisite conditions are not limited to those listed above, and appropriate conditions may be adopted.

As to the determination of deteriorated state of NOx catalytic converter 72, electronic controller 9 makes a determination in the following manner, through the determination process of step S210.

(a) When all the prerequisite conditions are satisfied, it is determined that the deteriorated state of NOx catalytic converter 72 can be determined with high accuracy. When this determination is made, the flow proceeds to step S212.

(b) If any of the prerequisite conditions is not satisfied, it is determined that the deteriorated state of NOx catalytic converter 72 cannot be determined with high accuracy. When this determination is made, the "catalyst deterioration determining process" is temporarily stopped.

[Step S122] Estimated temperature (the first estimated exhaust gas temperature TEIE) of the exhaust gas flowing to catalyst loaded PM filter 73 is calculated. The first estimated exhaust gas temperature TEIE can be calculated from the state of engine operation (such as the measured engine speed NEM and the amount of fuel injection by fuel injection valve 51).

[Step S214] The first measured exhaust gas temperature TEiM is read.

[Step S220] Whether the difference between the first estimated exhaust gas temperature TEIE and the first measured exhaust gas temperature TEIM (first difference in exhaust gas temperature ΔTE) is not smaller than a reference temperature difference ΔTEX or not is determined. The reference temperature difference ΔTEX is set in advance through a test or the like as a threshold value to determine whether the first difference in exhaust gas temperature ΔTE is in a range indicating deteriorated state of NOx catalytic converter 72.

As to the determination of deteriorated state of NOx catalytic converter 72, electronic controller 9 makes a determination in the following manner, through the determination process of step S220.

(a) If the first difference in exhaust gas temperature ΔTE is not lower than the reference temperature difference ΔTEX, the NOx catalytic converter 72 is determined to be deteriorated. When this determination is made, the flow proceeds to step S222.

(b) If the first difference in exhaust gas temperature ΔTE is lower than the reference temperature difference ΔTEX, the NOx catalytic converter 72 is determined to be normally functioning. When this determination is made, the flow proceeds to step S224.

When the NOx catalytic converter 72 is deteriorated, oxidation of fuel at the NOx catalyst becomes insufficient, and therefore, the first measured exhaust gas temperature TEiM comes to be lower than the first measured exhaust gas temperature TEiM when the NOx catalytic converter 72 is in the normal state. On the other hand, the first estimated exhaust gas temperature TEiE is calculated on the premise that NOx catalytic converter 72 is functioning normally, and therefore it is always constant no matter whether NOx catalytic converter 72 is in the deteriorated state or normal state. Here, the measured value and estimated value when NOx catalytic converter 72 is in the deteriorated state and the measured value and estimated value when NOx catalytic converter 72 is in the normal state are compared under the same conditions (such as the state of engine operation).

Therefore, when NOx catalytic converter 72 is in the deteriorated state, the degree of deviation between the first measured exhaust gas temperature TEiM and the first estimated exhaust gas temperature TEiE becomes larger than when NOx catalytic converter 72 is in the normal state.

In the present process, utilizing such a tendency of deviation between the first measured exhaust gas temperature TEiM and the first estimated exhaust gas temperature TEiE, whether the NOx catalytic converter 72 is in the deteriorated state or not is determined. Specifically, when the degree of deviation between the first measured exhaust gas temperature TEiM and the first estimated exhaust gas temperature TEiE has reached such a magnitude that would not be reached when NOx catalytic converter 72 is functioning normally (the deviation is larger than a reference value), it is determined that the NOx catalytic converter 72 is in the deteriorated state.

[Step S222] The catalyst deterioration flag eFC is set "ON".

[Step S224] The catalyst deterioration flag eFC is set "OFF". The prerequisite conditions for determining deterioration of NOx catalytic converter 72 and the method of determining the deteriorated state are not limited to those described above, and modifications may be made appropriately.

(2) Temperature Increase Control Process

Figure 4:
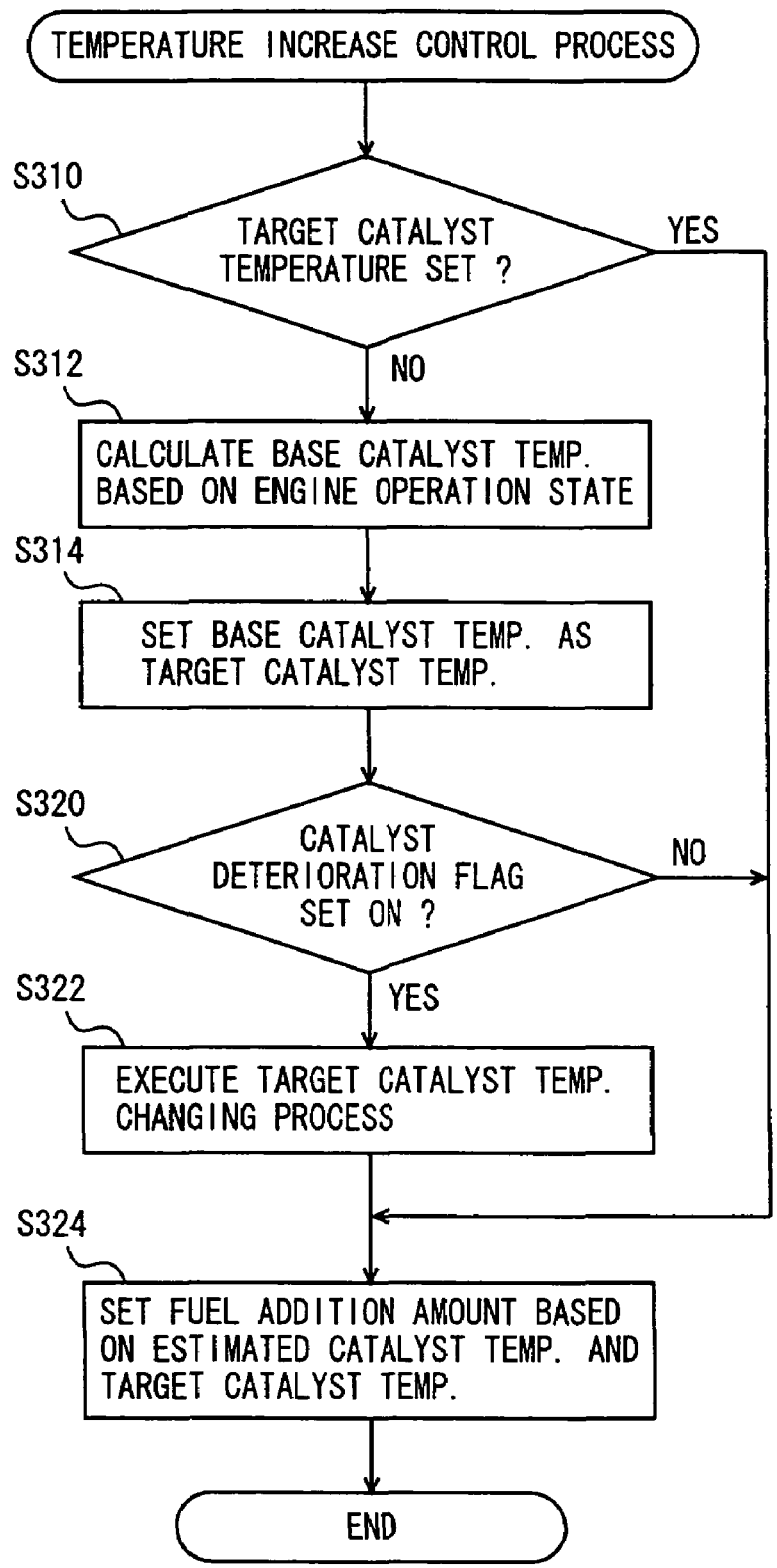
FIG. 4 is a flowchart representing process steps of "temperature increase control process" executed by the electronic controller in accordance with the first embodiment.

FIG. 4 shows the process steps of "temperature increase control process." This process is executed repeatedly by electronic controller 9 at a prescribed time interval, from when the conditions for executing PM regeneration control are satisfied until the conditions for terminating PM regeneration control are satisfied.

[Step S310] Whether the target catalyst temperature TFT has been set or not after the start of present PM regeneration control is determined. If the target catalyst temperature TFT is not set, the flow proceeds to the process of step S312. If target catalyst temperature TFT has already been set, the flow proceeds to the process of step S324.

[Step S312] Based on the state of engine operation (such as the measured engine speed NEM and fuel injection amount FI), a base catalyst temperature TFTbase is calculated. Here, the base catalyst temperature TFTbase is calculated using a map, in which the relation between the state of engine operation and the base catalyst temperature TFTbase is set in advance.

The base catalyst temperature TFTbase is set as a temperature higher than the lowest catalyst temperature necessary for burning PM on catalyst loaded PM filter 73 when NOx catalytic converter 72 is in the normal state. Therefore, when NOx catalytic converter 72 is in the normal state, deposited PM can sufficiently be burned if the filter catalyst temperature TF is maintained at the base catalyst temperature TFTbase throughout the "temperature increase control process."

[Step S314] The base catalyst temperature TFTbase is set as the target catalyst temperature TFT.

[Step S320] Whether the catalyst deterioration flag eFC is "ON" or not is determined.

As to the target catalyst temperature TFT of catalyst loaded PM filter 73, electronic controller 9 makes a determination in the following manner, through the determination process of step S320.

(a) When the catalyst deterioration flag eFC is "ON" and the base catalyst temperature TFTbase is set as the target catalyst temperature TFT, it is determined that PM deposited on catalyst loaded PM filter 73 can not fully be burned. If this determination is made, the flow proceeds to the process of step S322.

(b) When the catalyst deterioration flag eFC is "OFF", it is determined that PM deposited on catalyst loaded PM filter 73 can fully be burned by setting the base catalyst temperature TFTbase as the target catalyst temperature TFT. If this determination is made, the flow proceeds to the process of step S324.

After it is established that the base catalyst temperature TFTbase is set as the target catalyst temperature TFT through the process of step S320 until the end of the present PM regeneration control (until conditions for terminating PM regeneration control are satisfied), the base catalyst temperature TFTbase is maintained as target catalyst temperature TFT.

[Step S322] "Target catalyst temperature changing process" (FIG. 5) is executed. After the target catalyst temperature TFT is set through this process, the flow proceeds to the process of step S324.

[Step S324] Based on the target catalyst temperature TFT, the amount of fuel addition (fuel addition amount FA) to the exhaust gas by fuel addition valve 71 is set. Here, based on the difference between the target catalyst temperature TFT and the estimated filter catalyst temperature (estimated catalyst temperature TFE), the amount of fuel addition FA necessary for maintaining the filter catalyst temperature TF at the target catalyst temperature TFT is calculated.

The estimated catalyst temperature TFE is calculated as a representative value of catalyst temperature of catalyst loaded PM filter 73. As an example of the method of calculating estimated catalyst temperature TFE, a method may be used in which a value obtained by correcting the first measured exhaust gas temperature TEiM or the second measured exhaust gas temperature TEoM based on the flow rate of exhaust gas (the measured intake air flow rate GAM) is used as the estimated catalyst temperature TFE.

In fuel addition control performed separately by electronic controller 9, every time the fuel addition amount FA is set in step S324, addition valve 71 is controlled so that the fuel of the fuel addition amount FA is injected from fuel addition valve 71. As the fuel addition by fuel addition valve 71 is repeated in this manner, filter catalyst temperature TF comes to be maintained at the target catalyst temperature TFT (or catalyst temperature close to that).

(3) Target Catalyst Temperature Changing Process

Figure 5:
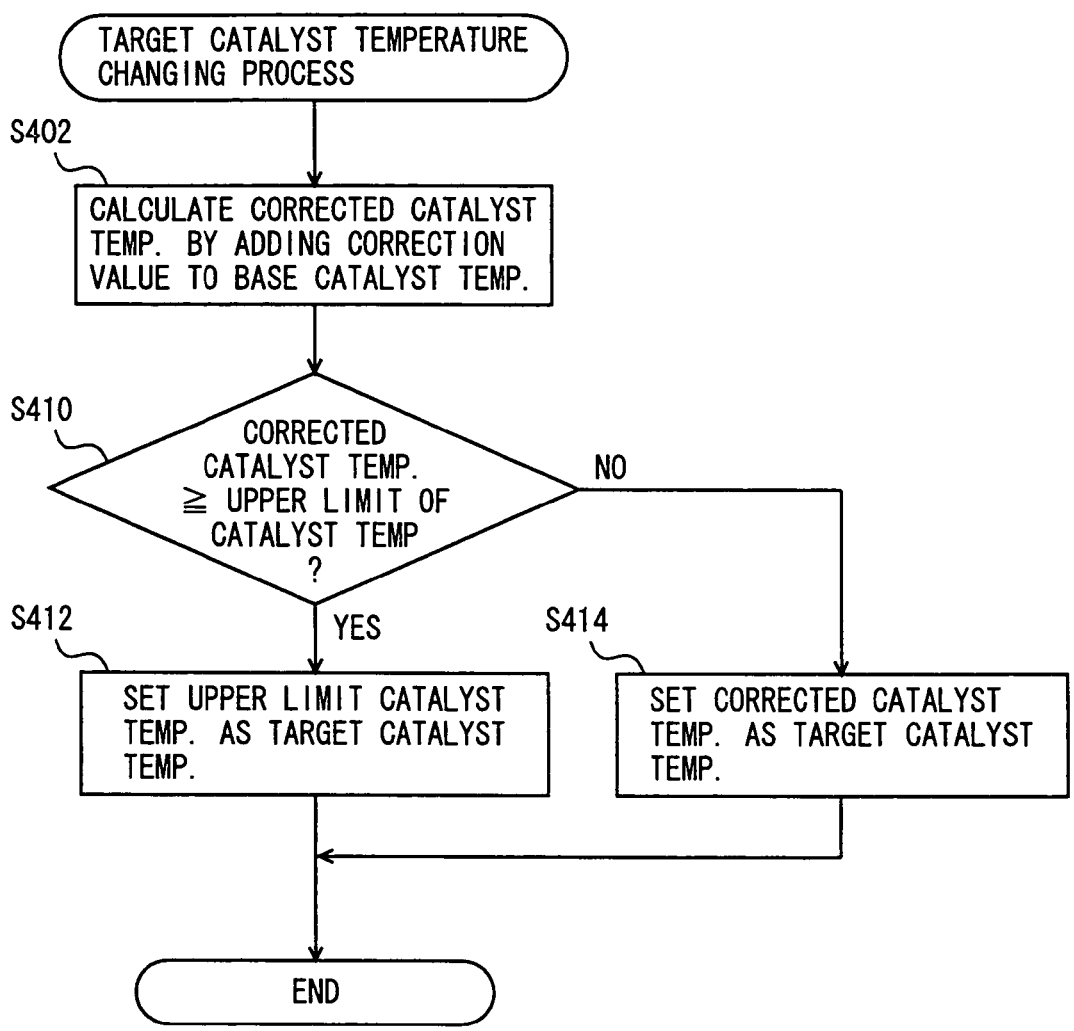
FIG. 5 is a flowchart representing process steps of "target catalyst temperature changing process" executed by the electronic controller in accordance with the first embodiment.

"Target catalyst temperature changing process" will be described with reference to FIG. 5.

[Step S402] A corrected catalyst temperature TFH is calculated. Here, the corrected catalyst temperature TFH is calculated by adding a temperature correcting value TFA to base catalyst temperature TFTbase. In other words, corrected catalyst temperature TFH is calculated as a value larger than the base catalyst temperature TFTbase.

The temperature correcting value TFA is set in advance through a test or the like as a value that compensates for the shortage of PM burning ability when the base catalyst temperature TFTbase is set as the target catalyst temperature with the NOx catalytic converter 72 being in the deteriorated state.

[Step S410] Whether the corrected catalyst temperature TFH is not lower than an upper limit of catalyst temperature TFUL or not is determined. The upper limit of catalyst temperature TFUL corresponds to the highest value of filter catalyst temperature TF that does not cause thermal damage to catalyst loaded PM filter 73. It is set in advance through a test or the like.

As to the target catalyst temperature TFT, electronic controller 9 makes a determination in the following manner, through the determination process of step S410.

(a) When the corrected catalyst temperature TFH is not lower than the upper limit of catalyst temperature TFUL and the corrected catalyst temperature TFH is set as the target catalyst temperature TFT, it is determined that catalyst loaded PM filter 73 may possibly be damaged by heat. When this determination is made, the flow proceeds to the process of step S412.

(b) When the corrected catalyst temperature TFH is lower than the upper limit of catalyst temperature TFUL, it is determined that catalyst loaded PM filter 73 may not possibly be damaged by heat even if corrected catalyst temperature TFH is set as the target catalyst temperature TFT. When this determination is made, the flow proceeds to the process of step S414.

[Step S4112] The upper limit of catalyst temperature TFUL is set as the target catalyst temperature TFT.

[Step S414] The corrected catalyst temperature TFH is set as the target catalyst temperature TFT. After the target catalyst temperature TFT is set through the process of step S412 or S414 until the end of the present PM regeneration control (until conditions for terminating PM regeneration control are satisfied), the corrected catalyst temperature TFH is maintained as target catalyst temperature TFT.

<Catalyst Temperature of Catalyst Loaded PM Filter>

Figure 6:
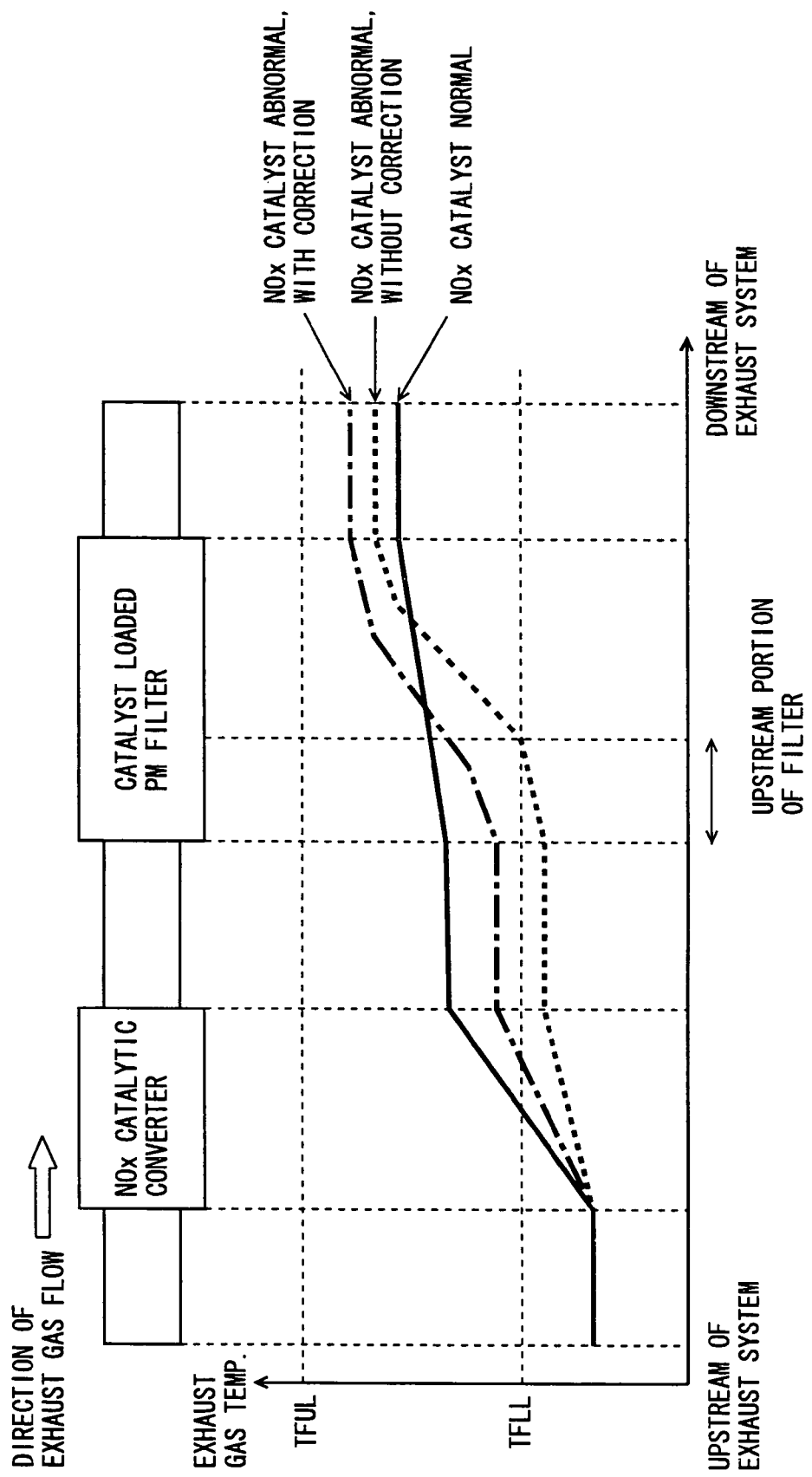
FIG. 6 is a graph plotting variation in exhaust gas temperature under PM regeneration control.

Referring to FIG. 6, temperature at various portions of exhaust gas purifier 7 under PM regeneration control will be described. Here, temperature at various portions of exhaust gas purifier 7 will be described in comparison with an exhaust gas purifier in which the target catalyst temperature TFT is not changed when the NOx catalytic converter 72 is in the deteriorated state (an exhaust gas purifier in which the base catalyst temperature TFTbase is set as the target catalyst temperature when the NOx catalytic converter 72 is in the deteriorated state: hereinafter simply referred as the other exhaust gas purifier). In the following description, it is assumed that the operation states are the same, other than whether the NOx catalytic converter 72 is deteriorated or not.

In FIG. 6, a solid line, a dotted line and a chain-dotted line respectively represent temperature of the following examples.

The solid line represents the temperature when PM regeneration control is performed while NOx catalytic converter 72 is in the normal state, in the exhaust gas purifier 7 of the present embodiment and in the other exhaust gas purifier.

The dotted line represents the temperature when PM regeneration control is performed while NOx catalytic converter 72 is in the deteriorated state, in the other exhaust gas purifier.

The chain-dotted line represents the temperature when PM regeneration control is performed while NOx catalytic converter 72 is in the deteriorated state, in the exhaust gas purifier 7 of the present embodiment.

(1) Catalyst Temperature of NOx Catalytic Converter

While the PM regeneration control is being executed with the NOx catalytic converter being in the deteriorated state, the corrected catalyst temperature TFH (or the upper limit of catalyst temperature TFUL), which is higher than the base catalyst temperature TFTbase, is set as target catalyst temperature TFT in exhaust gas purifier 7 in accordance with the present embodiment. In contrast, the base catalyst temperature TFTbase is set as target catalyst temperature TFT in the other exhaust gas purifier.

Therefore, the amount of fuel added from fuel addition valve 71 to the exhaust gas (fuel amount FA) in exhaust gas purifier 7 of the present embodiment becomes larger than the fuel addition amount FA in the other exhaust gas purifier. Specifically, in exhaust gas purifier 7 of the present embodiment, the amount of heat generated through oxidation of fuel at NOx catalytic converter 72 exceeds the amount of heat generated in the other exhaust gas purifier.

Consequently, the temperature of NOx catalytic converter 72 in exhaust gas purifier 7 of the present embodiment becomes higher than the temperature of NOx catalytic converter 72 in the other exhaust gas purifier. Accordingly, the temperature of exhaust gas supplied to catalyst loaded PM filter 73 exceeds the temperature of exhaust gas in the other exhaust gas purifier.

(2) Catalyst Temperature of Catalyst Loaded PM Filter

While the PM regeneration control is executed with NOx catalytic converter 72 being in the deteriorated state, the temperature of exhaust gas supplied from NOx catalytic converter 72 to catalyst loaded PM filter 73 in exhaust gas purifier 7 of the present embodiment is higher than that in the other exhaust gas purifier, and therefore, the catalyst temperature of catalyst loaded PM filter 73 as a whole becomes higher than in the other exhaust gas purifier.

Consequently, the catalyst temperature of the entire region including the upstream portion 73A of the filter is increased to a value higher than the lower limit of catalytic temperature TFLL (lowest necessary catalyst temperature for sufficiently burning PM) more frequently than in the other exhaust gas purifier, and hence, decrease in the ability of PM purification at the upstream portion 73A of the filter can be suppressed.

By way of example, even in a state where the catalyst temperature at the upstream portion 73A of the filter cannot reach the lower limit of catalyst temperature TFLL in the other exhaust gas purifier, the catalyst temperature of the entire region including the upstream portion 73A of the filter can be increased to be higher than the lower limit of catalyst temperature TFLL in catalyst loaded PM filter 73 of the present embodiment.

As described above, in exhaust gas purifier 7 of the present embodiment, decrease in the ability of PM purification at the upstream portion 73A of the filter can be suppressed when NOx catalytic converter 72 is in the deteriorated state, and therefore, it is possible to burn larger amount of deposited PM than in the other exhaust gas purifier. Specifically, PM at the upstream portion 73A of the filter, which could not be burned by the other exhaust gas purifier, can be burned when NOx catalytic converter 72 is in the deteriorated state.

Effects of the Embodiment

As described in detail in the foregoing, the exhaust gas purifier for internal combustion engine in accordance with the present embodiment attains the following effects.

(1) In exhaust gas purifier 7 of the present embodiment, when NOx catalytic converter 72 is in the deteriorated state, the corrected catalyst temperature TFH (or the upper limit of catalyst temperature TFUL), which is larger than the base catalyst temperature TFTbase, is set as the target catalyst temperature TFT. Therefore, the catalyst temperature of the entire region of catalyst loaded PM filter 73 comes to be increased to a value higher than the lower limit of catalytic temperature TFLL with higher frequency, and hence, decrease in the ability of PM purification at the upstream portion 73A of the filter can be suppressed.

(2) In the other exhaust gas purifier, when NOx catalytic converter 72 is in the deteriorated state, PM at the upstream portion 73A of the filter is not fully burned, and therefore, even after the end of PM regeneration control, much PM is continuously deposited on the upstream portion 73A of the filter. When the amount of deposited PM attains excessively large, abrupt burning of PM (thermal runaway of PM) occurs. In such a case, catalyst temperature of catalyst loaded PM filter 73 becomes extremely high, causing damage to the filter 73.

In exhaust gas purifier 7 of the present embodiment, when NOx catalytic converter 72 is in the deteriorated state, the filter catalyst temperature TF is made higher than in the other exhaust gas purifier, and therefore, it becomes possible to burn larger amount of PM at the upstream portion 73A of the filter. As a result, it becomes possible to prevent damage to catalyst loaded PM filter 73 caused by thermal runaway of PM.

(3) In exhaust gas purifier 7 of the present embodiment, when the corrected catalyst temperature TFH is not lower than the upper limit of catalyst temperature TFUL, the upper limit of catalyst temperature TFUL is set as the target catalyst temperature TFT. Consequently, even when the target catalyst temperature TFT is changed to a value higher than the base catalyst temperature TFTbase, any damage caused by heat on catalyst loaded PM filter 73 can be suppressed.

(4) In exhaust gas purifier 7 of the present embodiment, every time the conditions for executing the PM regeneration control are satisfied, deterioration determination of NOx catalytic converter 72 is performed, and the target catalyst temperature is set. Therefore, decreased mileage derived from the target catalyst temperature set at an unnecessarily high value can be suppressed.

<Modification>

The first embodiment described above may be appropriately modified and implemented in the following manner.

In the first embodiment above, the magnitude of temperature correcting value TFA may be set in consideration of the degree of deterioration of NOx catalytic converter 72. By way of example, as an index of the degree of deterioration of NOx catalytic converter 72, the first difference in exhaust gas temperature ΔTE may be used, and from a map in which the relation between the index value and the temperature correcting value TFA is set in advance, the temperature correcting value TFA may be calculated. In that case, the relation between these parameters is set such that as the first difference in exhaust gas temperature ΔTE becomes larger, the temperature correcting value TFA is also made larger.

Second Embodiment

The second embodiment of the present invention will be described with reference to FIG. 7.

In the present embodiment, the manner of setting the target catalyst temperature TFT in "temperature increase control process" of the first embodiment is changed in the manner as will be described in the following. The exhaust gas purifier 7 in accordance with the present embodiment has the same structure as the exhaust gas purifier of the first embodiment, except for the points that will be described in the following.

<Temperature Increase Control Process>

FIG. 7 shows the process steps of "temperature increase control process." This process is executed repeatedly by electronic controller 9 at a prescribed time interval, from when the conditions for executing PM regeneration control are satisfied until the conditions for terminating PM regeneration control are satisfied.

[Step T310] Whether the target catalyst temperature TFT has been set or not after the start of present PM regeneration control is determined. If the target catalyst temperature TFT is not set, the flow proceeds to the process of step TS320. If target catalyst temperature TFT has already been set, the flow proceeds to the process of step T326.

[Step T320] Whether the catalyst deterioration flag eFC is "ON" or not is determined. When the catalyst deterioration flag eFC is "OFF", the flow proceeds to the process of step T322. When the catalyst deterioration flag eFC is "ON", the flow proceeds to the process of step T324.

[Step T322] Using a map in which the relation between the state of engine operation (such as the measured engine speed NEM and the amount of fuel injection by fuel injection valve 51) and a first target catalyst temperature TFT1 is set in advance, the first target catalyst temperature TFT1 is calculated. Then, the calculated first target catalyst temperature TFT1 is set as the target catalyst temperature TFT.

The first target catalyst temperature TFT1 is set as a catalyst temperature that allows sufficient burning of PM on catalyst loaded PM filter 73 when NOx catalytic converter 72 is in the normal state. Specifically, when NOx catalytic converter 72 is in the normal state, the deposited PM can fully be burned if the filter catalyst temperature TF is maintained at the first target catalyst temperature TFT1 through the "temperature increase control process."

[Step T324] Using a map in which the relation between the state of engine operation (such as the measured engine speed NEM and the amount of fuel injection by fuel injection valve 51) and a second target catalyst temperature TFT2 is set in advance, the second target catalyst temperature TFT2 is calculated. Then, the calculated second target catalyst temperature TFT2 is set as the target catalyst temperature TFT.

When the first target catalyst temperature TFT1 and the second target catalyst temperature TFT2 calculated based on the same state of engine operation are compared, the second target catalyst temperature TFT2 is higher than the first target catalyst temperature TFT1 Specifically, when the NOx catalytic converter 72 is in the deteriorated state, the second target catalyst temperature TFT2 that is larger than the first target catalyst temperature TFT1 is set as the target catalyst temperature TFT. It is noted that the map for calculating the second target catalyst temperature TFT2 is adapted such that the second target catalyst temperature TFT2 does not exceed the upper limit of catalyst temperature TFUL in any state of engine operation.

[Step T326] Based on the target catalyst temperature TFT, the amount of fuel addition to the exhaust gas by fuel addition valve 71 (fuel addition amount FA) is set. Here, based on the difference between the target catalyst temperature TFT and estimated catalyst temperature TFE, the fuel addition amount FA necessary for maintaining the filter catalyst temperature TF at the target catalyst temperature TFT is calculated.

In fuel addition control performed separately by electronic controller 9, every time the fuel addition amount FA is set in step T326, addition valve 71 is controlled so that the fuel of the fuel addition amount FA is injected from fuel addition valve 71. As the fuel addition by fuel addition valve 71 is repeated in this manner, filter catalyst temperature TF comes to be maintained at the target catalyst temperature TFT (or catalyst temperature close to that).

Effects of the Embodiment

As described in detail in the foregoing, the exhaust gas purifier for internal combustion engine in accordance with the second embodiment attains the following effects, in addition to the effects similar to effects (2) and (4) of the first embodiment.

(5) In exhaust gas purifier 7 of the present embodiment, when NOx catalytic converter 72 is in the deteriorated state, the second target catalyst temperature TFT2 that is higher than the first target catalyst temperature TFT1 is set as the target catalyst temperature TFT. Therefore, the catalyst temperature of the entire region of catalyst loaded PM filter 73 comes to be increased to a value higher than the lower limit of catalytic temperature TFLL with higher frequency, and hence, decrease in the ability of PM purification at the upstream portion 73A of the filter can be suppressed.

(6) In exhaust gas purifier 7 of the present embodiment, the map for calculating the second target catalyst temperature TFT2 is adapted such that the second target catalyst temperature TFT2 does not exceed the upper limit of catalyst temperature TFUL in any state of engine operation. Therefore, even when the second target catalyst temperature TFT2 is set as the target catalyst temperature TFT, any damage caused by heat on catalyst loaded PM filter 73 can be suppressed.

Third Embodiment

The third embodiment of the present invention will be described with reference to FIG. 8.

In the present embodiment, "target catalyst temperature changing process" of the first embodiment is changed in the manner as will be described in the following. The exhaust gas purifier 7 in accordance with the present embodiment has the same structure as the exhaust gas purifier of the first embodiment, except for the points that will be described in the following.

<Target Catalyst Temperature Changing Process>

Figure 8:
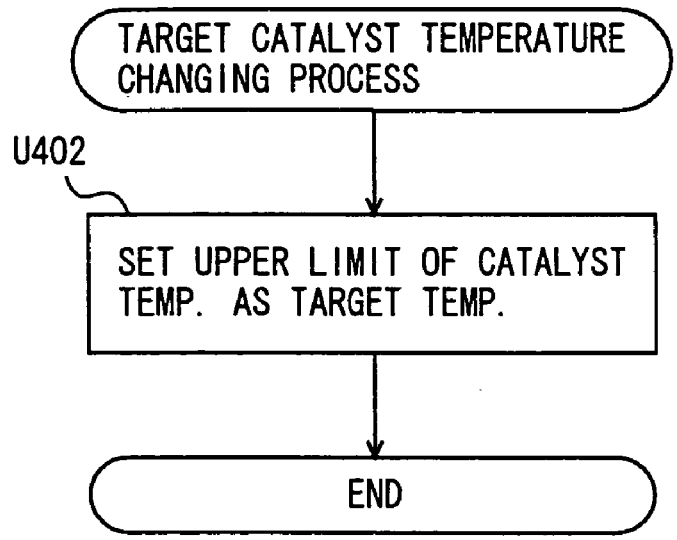
FIG. 8 is a flowchart representing process steps of "target catalyst temperature changing process" executed by an electronic controller in accordance with a third embodiment of an exhaust gas purifier for an internal combustion engine of the present invention.

FIG. 8 shows the "target temperature changing process" in accordance with the present embodiment.

[Step U402] The upper limit of catalyst temperature TFUL is set as the target catalyst temperature TFT.

It is noted that the upper limit of catalyst temperature TFUL corresponds to the highest possible value of filter catalyst temperature FT that does not cause thermal damage to the exhaust filter, and is set in advance through a test or the like.

Effects of the Embodiment

As described in detail in the foregoing, the exhaust gas purifier for internal combustion engine in accordance with the third embodiment attains the following effects, in addition to the effects similar to effects (2) and (4) of the first embodiment.

(7) In exhaust gas purifier 7 of the present embodiment, when NOx catalytic converter 72 is in the deteriorated state, the upper limit of catalyst temperature TFUL, which is higher than the base catalyst temperature TFTbase, is set as the target catalyst temperature TFT. Therefore, the catalyst temperature of the entire region of catalyst loaded PM filter 73 comes to be increased to a value higher than the lower limit of catalytic temperature TFLL with higher frequency, and hence, decrease in the ability of PM purification at the upstream portion 73A of the filter can be suppressed.

(8) Further, even when the target catalyst temperature TFT is changed to a value higher than the base catalyst temperature TFTbase, any damage caused by heat on catalyst loaded PM filter 73 can be suppressed.

Fourth Embodiment

The fourth embodiment of the present invention will be described with reference to FIG. 9.

In the present embodiment, the manner of setting the target catalyst temperature in "target catalyst temperature changing process" of the first embodiment is changed in the manner as will be described in the following. The exhaust gas purifier 7 in accordance with the present embodiment has the same structure as the exhaust gas purifier of the first embodiment, except for the points that will be described in the following.

<Target Catalyst Temperature Changing Process>

Figure 9:
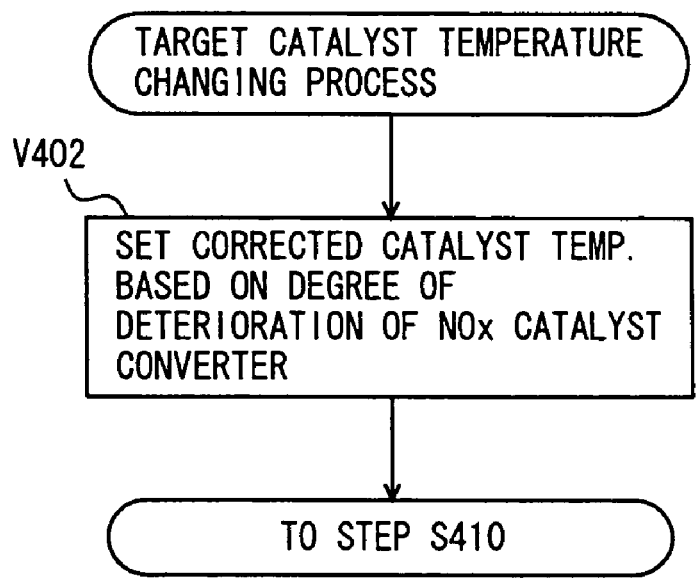
FIG. 9 is a flowchart representing process steps of "target catalyst temperature changing process" executed by an electronic controller in accordance with a fourth embodiment of an exhaust gas purifier for an internal combustion engine of the present invention.

FIG. 9 shows a part of the "target temperature changing process" in accordance with the present embodiment.

[Step V402] Based on an index indicating the degree of deterioration of NOx catalytic converter 72, the corrected catalyst temperature TFH is calculated. Here, as the index, the difference between the first estimated exhaust gas temperature TEIE and the first measured exhaust gas temperature TEIM (first difference in exhaust gas temperature $\Delta$TE) is used. The corrected catalyst temperature TFH is calculated by applying the first difference in exhaust gas temperature $\Delta$TE to a map in which the relation between the first difference in exhaust gas temperature $\Delta$TE and the corrected catalyst temperature TFH is set in advance.

In the map, the relation between these parameters is set such that as the first difference in exhaust gas temperature $\Delta$TE becomes larger (as the degree of deterioration of NOx catalytic converter 72 increases), the corrected catalyst temperature TFH is also made higher. Further, the corrected catalyst temperature TFH is set as a value larger than the base catalyst temperature TFTbase and lower than the upper limit of catalyst temperature TFUL.

It is noted that the amount of remaining PM that has not been fully burned when NOx catalytic converter 72 is in the deteriorated state is correlated with the degree of deterioration of NOx catalytic converter 72. Therefore, in the process described above, the corrected catalyst temperature TFH is calculated in consideration of the degree of deterioration of NOx catalytic converter 72, so that excess or insufficiency of fuel addition amount FA is suppressed when NOx catalytic converter 72 is in the deteriorated state.

Effects of the Embodiment

As described in detail in the foregoing, the exhaust gas purifier for internal combustion engine in accordance with the fourth embodiment attains the following effects, in addition to the effects similar to effects (1), (2) and (4) of the first embodiment.

(9) In exhaust gas purifier 7 of the present embodiment, the corrected catalyst temperature TFH is calculated in consideration of the degree of deterioration of NOx catalytic converter 72. Therefore, when NOx catalytic converter 72 is in the deteriorated state, excess or insufficiency of fuel addition amount FA is suppressed, and it becomes possible to burn PM with high efficiency.

(10) In exhaust gas purifier 7 of the present embodiment, the corrected catalyst temperature TFH is set as a value larger than the base catalyst temperature TFTbase and lower than the upper limit of catalyst temperature TFUL. Therefore, even when the corrected catalyst temperature TFH is set as the target catalyst temperature TFT, any damage caused by heat on catalyst loaded PM filter 73 can be suppressed.

Fifth Embodiment

The fifth embodiment of the present invention will be described with reference to FIG. 10.

In the first embodiment described above, when NOx catalytic converter 72 is in the deteriorated state, the corrected catalyst temperature TFH is set as the target catalyst temperature TFT, so as to suppress decrease in PM purifying ability at the upstream portion 73A of the filter.

In contrast, in the present embodiment, when NOx catalytic converter 72 is in the deteriorated state, the catalyst temperature at the upstream portion 73A of the filter is increased to the target catalyst temperature TFT, to suppress decrease in PM purifying ability at the upstream portion 73A of the filter. Specifically, the fuel addition amount FA from fuel addition valve 71 is set such that the estimated value of catalyst temperature at the upstream portion 73A of the filter (estimated upstream catalyst temperature TFEU) converges to the target catalyst temperature TFT.

In the present embodiment, the "temperature increase control process" of the first embodiment described above is changed in the following manner. In accordance therewith, the "target catalyst temperature changing process" is not performed. Except for these modifications, the exhaust gas purifier has the same structure as that of the first embodiment.

<Temperature Increase Control Process>

Figure 10:
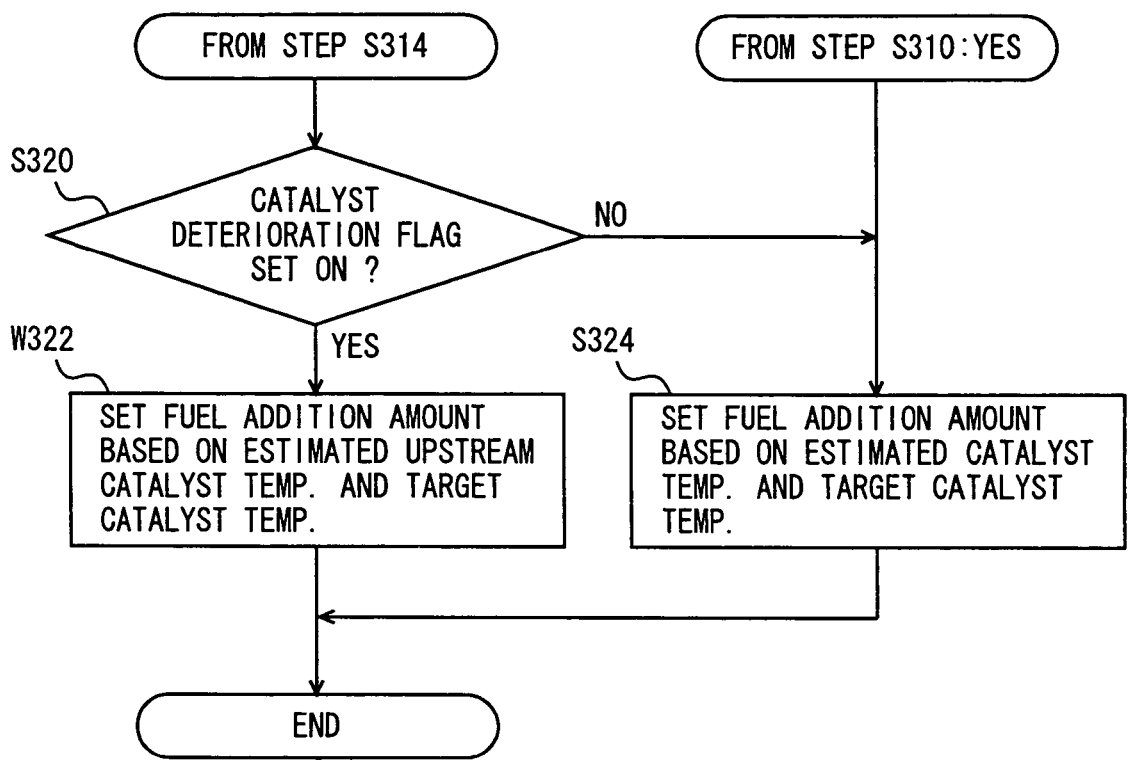
FIG. 10 is a flowchart representing process steps of "temperature increase control process" executed by an electronic controller in accordance with a fifth embodiment of an exhaust gas purifier for an internal combustion engine of the present invention.

FIG. 10 shows a part of "temperature increase control process" of the present embodiment.

In the "temperature increase control process" of the present embodiment, when it is determined in step S320 that the catalyst deterioration flag eFC is set "ON", the flow proceeds to the process of step W322. On the other hand, when it is determined that the catalyst deterioration flag eFC is set "OFF", the flow proceeds to the process of step W324.

[Step W322] Based on the target catalyst temperature TFT and estimated upstream catalyst temperature TFEU, the amount of fuel addition by fuel addition valve 71 to the exhaust gas (fuel addition amount FA) is set. Specifically, based on the difference between the target catalyst temperature TFT and estimated upstream catalyst temperature TFEU, the fuel addition amount FA necessary to maintain the filter catalyst temperature TF at the target catalyst temperature TFT is calculated.

In the above-described process, the estimated upstream catalyst temperature TFEU is calculated as a value representing the catalyst temperature at the upstream portion 73A of the filter. As an example of the method of calculation, the relation between the first measured exhaust gas temperature TEiM or the second measured exhaust gas temperature TEoM and the flow rate of exhaust gas (the measured intake air flow rate GAM) with respect to the estimated upstream catalyst temperature TFEU is set in advance in a map, and the estimated upstream catalyst temperature TFEU matching the present state of operation may be calculated using the map. If the estimated upstream catalyst temperature TFEU is calculated through a separate process, the fuel addition amount FA may be set with reference to the calculated value.

In fuel addition control performed separately by electronic controller 9, every time the fuel addition amount FA is set in step W322, addition valve 71 is controlled so that the fuel of the fuel addition amount FA is injected from fuel addition valve 71. As the fuel addition by fuel addition valve 71 is repeated in this manner, catalyst temperature at the upstream portion 73A of the filter comes to be maintained at the target catalyst temperature TFT (or catalyst temperature close to that).

Effects of the Embodiment

As described in detail in the foregoing, the exhaust gas purifier for internal combustion engine in accordance with the fifth embodiment attains the following effects, in addition to the effect similar to effect (1) of the first embodiment.

(11) In exhaust gas purifier 7 of the present embodiment, when NOx catalytic converter 72 is in the deteriorated state, the fuel addition amount FA is set such that the estimated upstream catalyst temperature TFEU attains to the target catalyst temperature TFT. Consequently, the catalyst temperature of the entire region of catalyst loaded PM filter 73 is increased to a value higher than the lower limit of catalytic temperature TFLL, and hence, decrease in the ability of PM purification at the upstream portion 73A of the filter can be suppressed.

<Modification>

The fifth embodiment described above may be modified appropriately in the following manner.

In the fifth embodiment above, when NOx catalytic converter 72 is in the deteriorated state, the estimated upstream catalyst temperature TFEU is calculated to monitor the catalyst temperature at the upstream portion 73A of the filter. The catalyst temperature, however, may directly be monitored by a sensor.

Sixth Embodiment

The sixth embodiment of the present invention will be described with reference to FIG. 11.

In the first embodiment described above, when NOx catalytic converter 72 is in the deteriorated state, corrected catalyst temperature TFH is set as the target catalyst temperature TFT, to suppress decrease in the ability of PM purification at the upstream portion 73A of the filter.

In contrast, in the present embodiment, when NOx catalytic converter 72 is in the deteriorated state, the fuel addition amount FA set based on the target catalyst temperature TFT is corrected and increased, to suppress decrease in the ability of PM purification at the upstream portion 73A of the filter.

In the present embodiment, the "temperature increase control process" of the first embodiment above is modified in the following manner. In accordance therewith, the "target catalyst temperature changing process" is not performed. Except for these modifications, the exhaust gas purifier has the same structure as that of the first embodiment.

<Temperature Increase Control Process>

Figure 11:
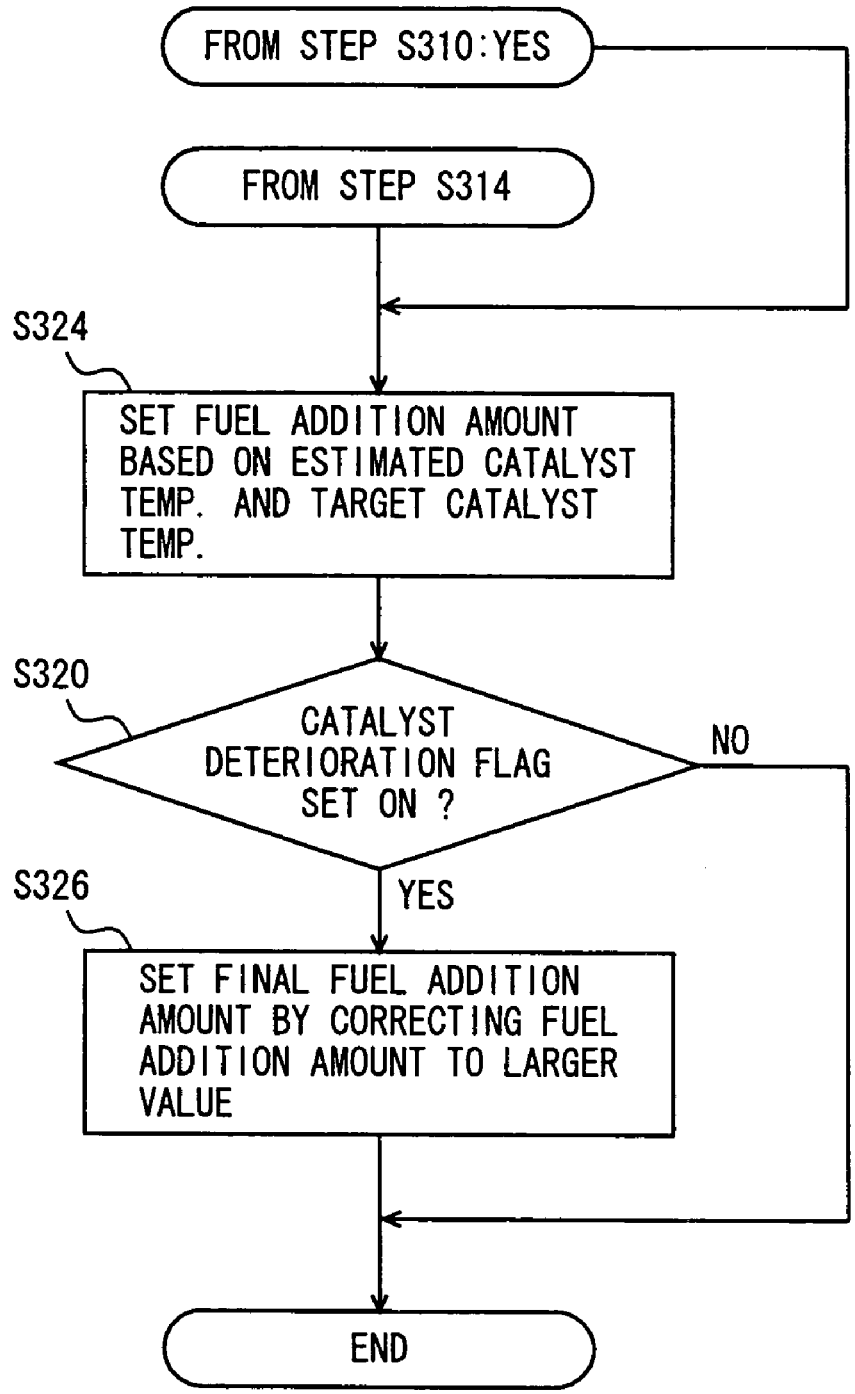
FIG. 11 is a flowchart representing process steps of "temperature increase control process" executed by an electronic controller in accordance with a sixth embodiment of an exhaust gas purifier for an internal combustion engine of the present invention.

FIG. 11 shows a part of the "temperature increase control process" in accordance with the present embodiment.

In the "temperature increase control process" of the present embodiment, after the process of step S314, the fuel addition amount FA (base fuel addition amount FAbase) is set through the process of step S324. Then, whether the catalyst deterioration flag eFC has been set "ON" through the process of step S320 or not is determined.

(A) When the catalyst deterioration flag eFC has not been set "ON", the "temperature increase control process" is temporarily stopped.

In fuel addition control performed separately by electronic controller 9, when NOx catalytic converter 72 is in the normal state, addition valve 71 is controlled so that the fuel of the base fuel addition amount FAbase is injected from fuel addition valve 71. As fuel addition by the fuel addition valve 71 is repeated in this manner, filter catalyst temperature TF comes to be maintained at the target catalyst temperature TFT (or catalyst temperature close to that), when NOx catalytic converter 72 is in the normal state.

(B) When the catalyst deterioration flag eFC has been set "ON", the flow proceeds to the process of step S326.

In the process of step S326, a value (corrected fuel addition amount FAH) obtained by correcting the base fuel addition amount FAbase to a larger value is set as the fuel addition amount FA. The corrected fuel addition amount FAH may be calculated by adding a corrected addition amount FAF to the base fuel addition amount FAbase. As to the correction of base fuel addition amount FAbase to a larger value, the degree of correction is limited so that the estimated catalyst temperature TFE does not exceed the upper limit of catalyst temperature.

In fuel addition control performed separately by electronic controller 9, when NOx catalytic converter 72 is in the deteriorated state, addition valve 71 is controlled so that the fuel of the corrected fuel addition amount FAH is injected from fuel addition valve 71. As fuel addition by the fuel addition valve 71 is repeated in this manner, filter catalyst temperature TF comes to be maintained at the target catalyst temperature TFT in accordance with the corrected addition amount FAF, when NOx catalytic converter 72 is in the deteriorated state.

As described in detail in the foregoing, the exhaust gas purifier for internal combustion engine in accordance with the sixth embodiment attains the following effects, in addition to the effect similar to effect (2) of the first embodiment.

(12) In exhaust gas purifier 7 of the present embodiment, when NOx catalytic converter 72 is in the deteriorated state, the corrected fuel addition amount FAH that is larger than the base fuel addition amount FAbase is set as the fuel addition amount FA of the fuel addition valve 71. Therefore, the catalyst temperature of the entire region of catalyst loaded PM filter 73 comes to be increased to a value higher than the lower limit of catalytic temperature TFLL with higher frequency, and hence, decrease in the ability of PM purification at the upstream portion 73A of the filter can be suppressed.

(13) In exhaust gas purifier 7 of the present embodiment, the correction of base fuel addition amount FAbase to a larger value is performed such that the estimated catalyst temperature TFE does not exceed the upper limit of catalyst temperature TFUL. Thus, any damage caused by heat on catalyst loaded PM filter 73 can be suppressed.

<Modification>

The sixth embodiment described above may be modified appropriately in the following manner.

In the sixth embodiment above, the magnitude of corrected fuel addition amount FAH or the corrected addition amount FAF may be set in accordance with the degree of deterioration of NOx catalytic converter 72. By way of example, as an index of the degree of deterioration of NOx catalytic converter 72, the first difference in exhaust gas temperature $\Delta TE$ may be used, and from a map in which the relation between the index value and the corrected fuel addition amount FAH or the corrected addition amount FAF is set in advance, the corrected fuel addition amount FAH or the corrected addition amount FAF may be calculated. In that case, the relation between these parameters is set such that as the first difference in exhaust gas temperature $\Delta TE$ becomes larger, the corrected fuel addition amount FAH or the corrected addition amount FAF is also made larger.

Other Embodiments

The embodiments above may be appropriately modified and implemented in the following manner.

In each of the embodiments above, in "temperature increase control process," the target catalyst temperature TFT is once set and thereafter, the target catalyst temperature TFT is not updated until the conditions for terminating PM regeneration control are satisfied. The target catalyst temperature TFT may be calculated and updated every time the "temperature increase control process" is executed.

In each of the embodiments above, a catalyst loaded PM filter 73, which is a PM filter loaded with a storage reduction type NOx catalyst is used as the exhaust filter. Alternatively, a catalyst loaded filter, which is a PM filter loaded with an oxidizing catalyst, may be used as the exhaust filter. In short, any appropriate catalyst loaded filter that can trap PM loaded with a catalyst attaining catalytic function may be used as the exhaust filter.

Though NOx catalytic converter 72 is used as the catalyst device in each of the embodiments above, the catalyst device is not limited to NOx catalytic converter 72, and any device may be used, as long as it can promote oxidation of fuel in the exhaust gas.

Though fuel addition valve 71 is used for supplying additional fuel, fuel injection valve 51 may be used in place of fuel addition valve 71 for supplying additional fuel, or fuel injection valve 51 may be used together with fuel addition valve 71 for supplying additional fuel. In that case, the fuel can be injected in the expansion stroke or exhaust stroke by fuel injection valve 51 after the fuel for burning in the combustion chamber has been injected (pilot-injection or main injection) through fuel injection valve 51, so that the fuel can be injected to the exhaust gas.

Though the embodiments above have been described as applied to a diesel engine having such a structure as shown in FIG. 1, the present invention is applicable to an engine of an appropriate structure that includes a catalyst device and an exhaust filter downstream of the catalyst device, and allows supply of an additive (fuel) to the exhaust gas.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exhaust gas purifier for an internal combustion engine, including an additive supplying unit supplying an additive to the exhaust gas, a catalyst device having a function of promoting oxidation of said additive, and an exhaust filter arranged downstream of said catalyst device and having functions of trapping particulate matter and of promoting oxidation of said additive, comprising:

a processing unit increasing, when a condition for purifying the particulate matter trapped by said exhaust filter is satisfied, temperature of said exhaust filter to a target temperature by supplying the additive from said additive supplying unit; and a control unit changing the target temperature of said exhaust filter to a higher value, when deterioration of catalytic function of said catalyst device is detected, wherein said control unit determines, using temperature of exhaust gas in an exhaust passage downstream of said catalyst device and upstream of said exhaust filter as a reference exhaust gas temperature, that catalytic function of said catalyst device is deteriorated, when a degree of deviation between said reference exhaust gas temperature estimated based on a state of operation of said internal combustion engine and the reference exhaust gas temperature measured by an exhaust gas temperature sensor exceeds a reference value.

2. The exhaust gas purifier for an internal combustion engine according to claim 1, wherein said control unit changes said target temperature in consideration of degree of deterioration of catalytic function of said catalyst device.

3. The exhaust gas purifier for an internal combustion engine according to claim 1, wherein when the target temperature of said exhaust filter, set based on deterioration of catalytic function of said catalyst device, exceeds an upper limit of target temperature, said control unit sets said upper limit of target temperature as the target temperature of said exhaust filter.

4. The exhaust gas purifier for an internal combustion engine according to claim 1, wherein said control unit sets a first target temperature as a target temperature of said exhaust filter when deterioration of catalytic function of said catalyst device is not detected, and sets a second target temperature higher than said first target temperature as the target temperature of said exhaust filter when deterioration of catalytic function of said catalyst device is detected.

5. The exhaust gas purifier for an internal combustion engine according to claim 1, wherein said control unit sets the target temperature of said exhaust filter based on an index value indicating degree of deterioration of catalytic function of said catalyst device, when deterioration of catalytic function of said catalyst device is detected.

6. The exhaust gas purifier for an internal combustion engine according to claim 1, wherein said control unit sets an upper limit of target temperature of said exhaust filter as the target temperature of said exhaust filter, when deterioration of catalytic function of said catalyst device is detected.

7. The exhaust gas purifier for an internal combustion engine according to claim 1, wherein said control unit monitors temperature of an upstream portion in said exhaust filter and sets amount of supply of said additive to increase the temperature of the upstream portion to said target temperature, when deterioration of catalytic function of said catalyst device is detected.

8. The exhaust gas purifier for an internal combustion engine according to claim 7, wherein said control unit sets the amount of supply of said additive, based on a degree of deviation between the temperature at the upstream portion of said exhaust filter and said target temperature.

9. The exhaust gas purifier for an internal combustion engine according to claim 1, wherein said processing unit sets, when a condition for purifying the particulate matter trapped by said exhaust filter is satisfied, an amount of supply of said additive based on a difference between estimated temperature of said exhaust filter and the target temperature of said exhaust filter, and increases temperature of said exhaust filter to the target temperature by supplying the additive from said additive supplying unit; and said control unit corrects the amount of supply of said additive set based on the difference between estimated temperature of said exhaust filter and the target temperature of said exhaust filter, in a direction to increase the amount of supply, when deterioration of catalytic function of said catalyst device is detected.

10. The exhaust gas purifier for an internal combustion engine according to claim 9, wherein said control unit corrects the amount of supply of said additive in consideration of degree of deterioration of catalytic function of said catalyst device.

11. The exhaust gas purifier for an internal combustion engine according to claim 9, wherein said control unit limits degree of correction of the amount of supply of said additive such that estimated temperature of said exhaust filter is maintained lower than an upper limit of target temperature.

12. The exhaust gas purifier for an internal combustion engine according to claim 1, wherein said control unit corrects said target temperature to a larger value, when a degree of deviation between measured temperature of the exhaust gas flowing to said exhaust filter and estimated temperature of said exhaust gas exceeds a reference value.

13. The exhaust gas purifier for an internal combustion engine according to any of claims 1-11 or 12, wherein said exhaust filter is a filter trapping particulate matter, loaded with a storage reduction type NOx catalyst.

14. The exhaust gas purifier for an internal combustion engine according to any of claims 1-11 or 12, wherein said exhaust filter is a filter trapping particulate matter, loaded with an oxidizing catalyst.

* * * * *